(12) United States Patent
Min

(10) Patent No.: US 12,326,347 B2
(45) Date of Patent: Jun. 10, 2025

(54) UNDER-DISPLAY SENSOR

(71) Applicant: Hangzhou Single Micro Electronic Co., LTD., Zheijang (CN)

(72) Inventor: Byung Il Min, Zheijang (KR)

(73) Assignee: HANGZHOU SINGLE MICRO ELECTRONIC CO., LTD., Zheihang (CN)

( * ) Notice: Subject to any disclaimer, the term of this patent is extended or adjusted under 35 U.S.C. 154(b) by 1099 days.

(21) Appl. No.: 17/150,435

(22) Filed: Jan. 15, 2021

(65) Prior Publication Data

US 2021/0285764 A1    Sep. 16, 2021

(30) Foreign Application Priority Data

Jan. 15, 2020 (WO) ................ PCT/CN2020/072107
Jan. 15, 2020 (WO) ................ PCT/CN2020/072108
Jan. 23, 2020 (WO) ................ PCT/CN2020/074019
Jan. 12, 2021 (CN) ......................... 202110037625.5

(51) Int. Cl.
  *G01C 3/08*   (2006.01)
  *G01C 3/02*   (2006.01)
  *G01S 17/86*  (2020.01)
  *G02B 5/30*   (2006.01)

(52) U.S. Cl.
  CPC ................ *G01C 3/02* (2013.01); *G01S 17/86* (2020.01); *G02B 5/3025* (2013.01); *G09G 2360/142* (2013.01)

(58) Field of Classification Search
  CPC .......... G01C 3/02; G01S 17/04; G01S 17/86; G09G 5/10; G09G 2360/144; G09G 2360/142; G09G 2370/04; H04N 9/04557; G02B 5/3025
  See application file for complete search history.

(56) References Cited

U.S. PATENT DOCUMENTS

| | | | |
|---|---|---|---|
| 9,612,152 B2 | 4/2017 | Dejong et al. | |
| 10,777,623 B2 | 9/2020 | Rhee et al. | |
| 2018/0357462 A1* | 12/2018 | Mackey | G06V 40/1335 |
| 2019/0079236 A1* | 3/2019 | Hung | H10K 59/00 |

FOREIGN PATENT DOCUMENTS

| | | | | |
|---|---|---|---|---|
| JP | 2009229908 | | 10/2009 | |
| WO | WO 2020048921 A1 * | | 3/2020 | H01L 25/167 |

* cited by examiner

*Primary Examiner* — Mark Hellner
(74) *Attorney, Agent, or Firm* — Grossman, Tucker, Perreault & Pfleger, PLLC; Donald J. Perreault

(57) ABSTRACT

Under-display sensor provided. The under-display sensor includes an optical sensor, having an emitter configured for emitting a sensing light and a receiver configured for detecting an externally-reflected light reflected from an object and returned by the sensing light, a sensor polarization layer, being disposed over the optical sensor and having a polarization axis inclined at a first angle, and a sensor retardation layer, being disposed over the sensor polarization layer and having a slow axis inclined at the first angle with respect to the polarization axis.

21 Claims, 16 Drawing Sheets

UNDER-DISPLAY SENSOR

FIELD OF THE INVENTION

The present invention relates to an under-display sensor disposed under a display.

DISCUSSION OF THE RELATED ART

Optical sensors are used not only in portable electronic devices such as mobile phones and tablets, but also in imaging electronic devices such as TVs and monitors. The optical sensor includes, for example, an illuminance sensor, a proximity sensor, a proximity-illuminance sensor, and the like. The proximity sensor is an optical sensor that measures a distance between a user and an electronic device, and the illuminance sensor is an optical sensor that detects brightness around the electronic device. A proximity-illuminance sensor that combines the optical proximity sensor and the illuminance sensor is an implementation of two sensors in a single package.

In recent years, designs in which displays occupy almost the entire front of an electronic device are increasing. Although the size of the display increases according to the demand for a large screen, at least a portion of the front surface must still be secured in order to place a camera, in particular, the proximity-illuminance sensor. Proximity sensors using ultrasonic waves or the like can be applied to a display occupying the entire front, but it is difficult to integrate an illuminance sensing function. Meanwhile, although the illuminance sensor may be located in an area other than the front surface, it may be impossible to detect ambient light due to a case for protecting the electronic device. Therefore, the most ideal position where the proximity-illuminance sensor can be installed is the front of the electronic device, but in a design where the display occupies the entire front, it is difficult to secure a position to place a commercially-available proximity-illuminance sensor.

SUMMARY OF THE INVENTION

It is intended to provide an under-display sensor applicable to electronic devices with a design in which the display occupies the entire front.

There is provided an under-display sensor disposed under a display having a pixel configured for generating light, and a display retardation layer and a display polarization layer, both being disposed over the pixel. The under-display sensor includes an optical sensor, having an emitter configured for emitting a sensing light and a receiver configured for detecting an externally-reflected light reflected from an object and returned by the sensing light, a sensor polarization layer, being disposed over the optical sensor and having a polarization axis inclined at a first angle, and a sensor retardation layer, being disposed over the sensor polarization layer and having a slow axis inclined at the first angle with respect to the polarization axis.

In one embodiment, the sensor polarization layer and the sensor retardation layer convert the sensing light into a sensor circularly-polarized light for sensing so as to pass through the display polarization layer, and the sensor circularly-polarized light for sensing is converted into a display linearly-polarized light for sensing with a same polarization axis as the polarization axis of the display polarization layer by the display retardation layer.

In one embodiment, the slow axis of the sensor retardation layer and a slow axis of the display retardation layer are parallel, and the polarization axis of the display polarization layer is inclined at a second angle with respect to the slow axis of the display retardation layer.

In one embodiment, a difference between the second angle and the first angle is 90 degrees.

In one embodiment, the receiver includes a first receiver and a second receiver for detecting the externally-reflected light and an internally-reflected light reflected by the sensing light within the display.

In one embodiment, the sensor polarization layer includes a first sensor polarization layer, being disposed over the first receiver and having a polarization axis inclined at the first angle, and a second sensor polarization layer, being disposed over the second receiver and having a polarization axis inclined at the second angle.

In one embodiment, the first sensor polarization layer and the sensor retardation layer allow the externally-reflected light to pass, and the internally-reflected light to pass at a transmission blocking ratio of internal reflection, and the second sensor polarization layer and the sensor retardation layer allow the externally-reflected light to pass at a transmission blocking ratio of the external light, and the internally-reflected light to pass, wherein a brightness of the externally-reflected light is calculated using the transmission blocking ratio of the external light and the transmission blocking ratio of internal reflection.

In one embodiment, the transmission blocking ratio of the external light is measured when the emitter is turned off, and the transmission blocking ratio of internal reflection is measured when the externally-reflected light is not present.

In one embodiment, the sensor retardation layer includes a first sensor retardation layer, being disposed over the sensor polarization layer to correspond to the first receiver and having a slow axis inclined at the first angle with respect to the polarization axis, and a second sensor retardation layer, being disposed over the sensor polarization layer to correspond to the second receiver and having a slow axis inclined at the second angle with respect to the polarization axis.

In one embodiment, the under-display sensor further includes an emitter driver configured for driving the emitter, wherein the emitter driver includes a light source signal generator configured for generating a basic light source driving signal in which a continuous on period and a continuous off period are repeated, a carrier generator configured for generating a carrier signal having a frequency higher than that of the basic light source driving signal, a signal modulator configured for generating the modulated light source driving signal by frequency-modulating the continuous on period of the basic light source driving signal using the carrier signal, and a light source for generating a modulated sensing light by turning on and off at a frequency of the carrier signal during the continuous on period by the modulated light source driving signal.

In one embodiment, the under-display sensor further includes a band pass filter configured for removing a frequency component of the carrier signal from a pixel current, an amplifier configured for amplifying the pixel current from which the frequency component of the carrier signal has been removed, and an analog-to-digital converter configured for converting amplified pixel current into a digital signal.

In one embodiment, the first receiver and the second receiver are respectively located above two or more physically separated chips, wherein the under-display sensor is simultaneously driven under the control of a controller when the two or more chips are connected to the controller through $I^2C$ communication.

In one embodiment, each of the two or more chips includes an enable input/output pad, an I²C communication unit configured for receiving a first register value designating any one of a master chip and a slave chip and a second register value indicating an operating start from the controller through a data line, a register/memory configured for storing the first register value in a first register address and storing the second register value in a second register address, and a peripheral circuit configured for outputting an operating standby signal through the enable input/output pad when set as the master chip by the first register value, and configured for outputting an operating start signal through the enable input/output pad based on the second register value.

In one embodiment, when set as the slave chip by the first register value, the peripheral circuit is configured for receiving the operating standby signal through the enable input/output pad, and is configured for starting when receiving the operating start signal through the enable input/output pad.

In one embodiment, the under-display sensor further includes a clock input/output pad for providing an operating clock to another chip connected through the I²C communication when set as a clock master by the controller, and is configured for receiving the operating clock from one of the other chips or from an external device when set as a clock slave.

In one embodiment, the under-display sensor further includes a clock generator configured for generating the operating clock to be outputted through the clock input/output pad.

In one embodiment, the two or more chips start operating at a same operating start time and operating end at a same operating end time.

In one embodiment, each of the two or more chips includes an I²C communication unit configured for receiving a register value designating any one of a master chip and a slave chip from the controller through a data line, and configured for monitoring the operating start of the slave chip through the data line, a register/memory for storing the register value, and a peripheral circuit configured for starting when set as the master chip by the register value and the slave chip being monitored starts operating.

In one embodiment, when set to the master chip by the register value, the I²C communication unit is configured for storing a chip address of the slave chip provided by the controller, capturing a chip address being transmitted through the data line and comparing the stored chip address with the capture chip address, if the captured chip address is the same as the stored chip address, capturing a register address being transmitted to the slave chip, and comparing the captured register address with a register address in which a register value indicating the operating start is stored, wherein the master chip does not transmit a response signal to the controller even if the captured chip address is the same as the stored chip address.

In one embodiment, the peripheral circuit is configured for starting when the captured register address is the register address in which the register value indicating the operating start is stored.

In one embodiment, the I²C communication unit is configured for capturing the register value being transmitted to the slave chip, if the captured register address is the register address in which the register value indicating operating start is to be stored, wherein the peripheral circuit is configured for starting when the captured register value is the register value indicating the operating start.

In one embodiment, when the controller transmits the operating start command, the peripheral circuit waits until the slave chip starts operating.

In one embodiment, the under-display sensor further includes a clock input/output pad for providing the operating clock to another chip connected through the I²C communication when set as a clock master by the controller, and is configured for receiving the operating clock from one of the other chips or from an external device when set as a clock slave.

The under-display sensor according to embodiment of the present invention can be applicable to electronic devices with a design in which the display occupies the entire front.

BRIEF DESCRIPTION OF THE DRAWINGS

Hereinafter, embodiments of the invention will be described with reference to the accompanying drawings. For the purpose of easy understanding of the invention, the same elements will be referred to by the same reference signs. Configurations illustrated in the drawings are examples for describing the invention, and do not restrict the scope of the invention. Particularly, in the drawings, some elements are slightly exaggerated for the purpose of easy understanding of the invention. Since the drawings are used to easily understand the invention, it should be noted that widths, thicknesses, and the like of elements illustrated in the drawings might change at the time of actual implementation thereof.

DESCRIPTION OF EMBODIMENTS

Figure 1:
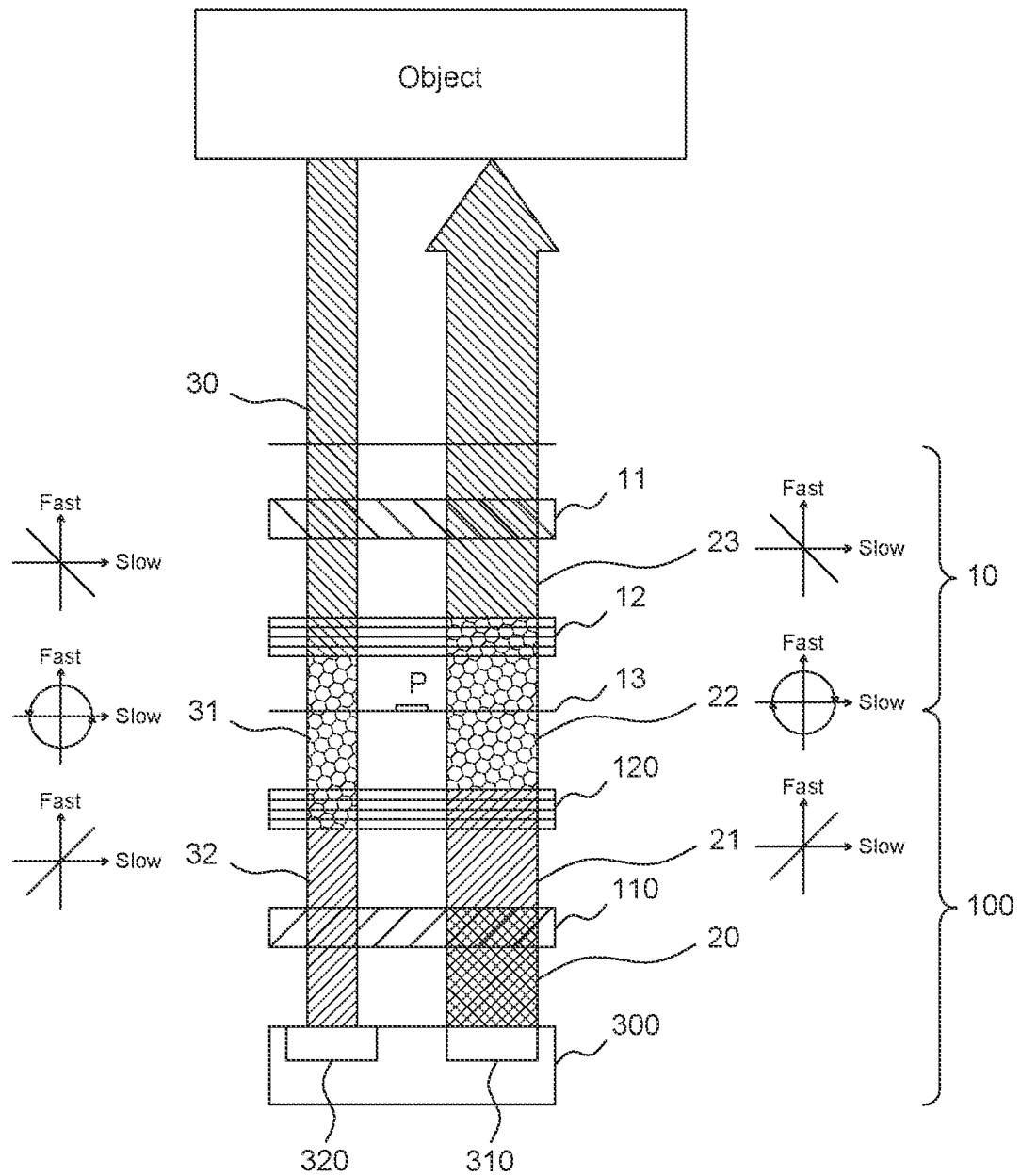
FIG. 1 exemplarily illustrates one embodiment of under-display sensor.

Embodiments which will be described below with reference to the accompanying drawings can be implemented singly or in combination with other embodiments. But this is not intended to limit the present invention to a certain embodiment, and it should be understood that all changes, modifications, equivalents or replacements within the spirits and scope of the present invention are included. Especially, any of functions, features, and/or embodiments can be implemented independently or jointly with other embodiments. Accordingly, it should be noted that the scope of the invention is not limited to the embodiments illustrated in the accompanying drawings.

On the other hand, among terms used in this specification, terms such as "substantially," "almost," and "about" are used to take consideration of a margin or an error at the time of actual embodiment. For example, "substantially 90 degrees" should be construed to include angles at which the same advantages as at 90 degrees can be expected. For example, "almost zero" should be construed to include a quantity which is slightly present but is ignorable.

On the other hand, unless otherwise mentioned, "side" or "horizontal" is used to mention a right-left direction in the drawings, and "vertical" is used to mention an up-down direction in the drawings. Unless otherwise defined, an angle, an incidence angle, and the like are defined with respect to a virtual straight line perpendicular to a horizontally flat surface illustrated in the drawings.

Hereinafter, throughout the accompanying drawings, the hatching line indicated on the retardation layer represents the direction of a slow axis, and the hatching line indicated on the polarizing layer exemplarily represents the direction of a polarization axis with respect to the slow axis extending in parallel. Meanwhile, it is shown that both the slow axis of the display retardation layer and the slow axis of the sensor retardation layer extend in a horizontal direction, or the slow axis of the display retardation layer and the slow axis of the sensor retardation layer extend in a vertical direction. It should be understood that this is merely a simple expression to aid understanding, and it is not necessary to align the slow axis of the sensor retardation layer with the slow axis of the display retardation layer.

FIG. 1 exemplarily illustrates one embodiment of under-display sensor.

The under-display sensor 100 includes a first sensor polarization layer 110, a first sensor retardation layer 120, and an optical sensor 300. The optical sensor 300 operates as a proximity sensor, and for this, includes an emitter 310 and a receiver 320. The emitter 310 may be a light emitting diode that generates sensing light belonging to a visible light band, a near-infrared light band, or an infrared band. The receiver 320 may detect visible light, near-infrared ray, or reflected light belonging to an infrared band. For example, the receiver 320 may be composed of a single photodiode or may be composed of a plurality of photodiodes. In case that the receiver 320 is composed of the plurality of photodiodes, it may be divided into two or more regions, and a band of light to be detected may differ for each region. In order to avoid interference, the emitter 310 and the receiver 320 may be optically separated. Although not shown, a collimating lens for improving the straightness of sensing light may be disposed over the emitter 310, and a condensing lens for collecting reflected light may be disposed over the receiver 320.

The first sensor polarization layer 110 is disposed over the optical sensor 300 and has a polarization axis inclined at a first angle, for example, +45 degrees with respect to a slow axis of the first sensor retardation layer 120. The first sensor retardation layer 120 is disposed over the first sensor polarization layer 110 and has, for example, a slow axis extending in a horizontal direction and a fast axis extending in a vertical direction. The slow axis of the first sensor retardation layer 120 may be substantially parallel to the slow axis of the display retardation layer 12.

The first sensor polarization layer 110 and the first sensor retardation layer 120 allow a sensing light generated by the emitter 310 to pass through a display 10 and propagate to the outside. In addition, the first sensor polarization layer 110 and the first sensor retardation layer 120 allow a reflected light reflected from an external object to pass through the display 10 to reach the receiver 320.

The emitter 310 generates the sensing light 20 that is unpolarized light. The sensing light 20 becomes a sensor linearly-polarized light for sensing 21 having a polarization axis inclined at the first angle while passing through the first sensor polarization layer 110. Since the polarization axis of the sensor linearly-polarized light for sensing 21 is inclined by, for example, +45 degrees with respect to the slow axis of the first sensor retardation layer 120, the sensor linearly-polarized light for sensing 21 becomes a sensor circularly-polarized light for sensing 22 that rotates clockwise as it passes through the first sensor retardation layer 120. When the first polarization component of the sensor linearly-polarized light for sensing 21 projected along the fast axis and the second polarization component of the sensor linearly-polarized light for sensing 21 projected along the slow axis pass through the first sensor retardation layer 120, a phase difference of $\lambda/4$ occurs between them. The sensor circularly-polarized light for sensing 22 is incident on the display through a bottom surface of the display 10.

The sensor circularly-polarized light for sensing 22 becomes a display linearly-polarized light for sensing 23 while passing through the display retardation layer 12. Since the slow axis of the display retardation layer 12 and the slow axis of the first sensor retardation layer 120 are substantially parallel, a $\lambda/4$ phase difference between the first polarization component and the second polarization component of the sensor circularly-polarized light for sensing 22 is added so the phase difference between them becomes $\lambda/2$. For this reason, the polarization axis of the display linearly-polarized light for sensing 23 is rotated by about 90 degrees from the first angle and is inclined at a second angle, for example, −45 degrees with respect to the slow axis of the display retardation layer 12.

The display linearly-polarized light for sensing 23 passes through the display polarization layer 11 substantially losslessly and propagates to the outside. The display polarization layer 11 may have a polarization axis inclined at the second angle, for example, −45 degrees with respect to the slow axis of the display retardation layer 12. Accordingly, the display linearly-polarized light for sensing 23 having a polarization axis inclined at the same angle as the polarization axis of the display polarization layer 11 may pass through the display polarization layer 11.

The display linearly-polarized light for sensing 23 that has propagated out of the display 10 is reflected by an object and is incident on the display 10 again. For the sake of distinction, the reflected light 30 incident on the display 10 is referred to as a reflected display linearly-polarized light. The reflected display linearly-polarized light 30 may have a polarization axis inclined at the second angle, for example, −45 degrees. Accordingly, the reflected display linearly-polarized light 30 having the polarization axis inclined at the same angle as the polarization axis of the display polarization layer 11 may pass through the display polarization layer 11.

The reflected display linearly-polarized light 30 passes through the display retardation layer 12 and becomes a reflected display circularly-polarized light 31 rotating in a counterclockwise direction. As described above, since the polarization axis of the display polarization layer 11 is inclined at −45 degrees with respect to the slow axis of the display retardation layer 12, λ/4 phase difference occurs between the first polarization component and the second polarization component of reflected display linearly-polarized light 30. The reflected display circularly-polarized light 31 is incident on the under-display sensor 100 through the bottom surface of the display 10.

The reflected display circularly-polarized light 31 becomes the reflected sensor linearly-polarized light 32 while passing through the first sensor retardation layer 120. As described above, since the slow axis of the display retardation layer 12 and the slow axis of the first sensor retardation layer 120 are substantially parallel, the λ/4 phase difference between the first polarization component and the second polarization component of the reflected display circularly-polarized light 31 is added, so that the phase difference between them becomes λ/2. Accordingly, the polarization axis of the reflected sensor linearly-polarized light 32 is rotated by about 90 degrees from the second angle to be inclined at the first angle, for example, +45 degrees with respect to the slow axis of the first sensor retardation layer 120.

The reflected sensor linearly-polarized light 32 passes through the first sensor polarization layer 110 substantially without loss and propagates to the receiver 320. The first sensor polarization layer 110 may have the polarization axis inclined at the first angle, for example, +45 degrees with respect to the slow axis of the first sensor retardation layer 120. Accordingly, the reflected sensor linearly-polarized light 32 having a polarization axis inclined at the same angle as the polarization axis of the first sensor polarization layer 110 may pass through the first sensor polarization layer 110.

Figure 2:
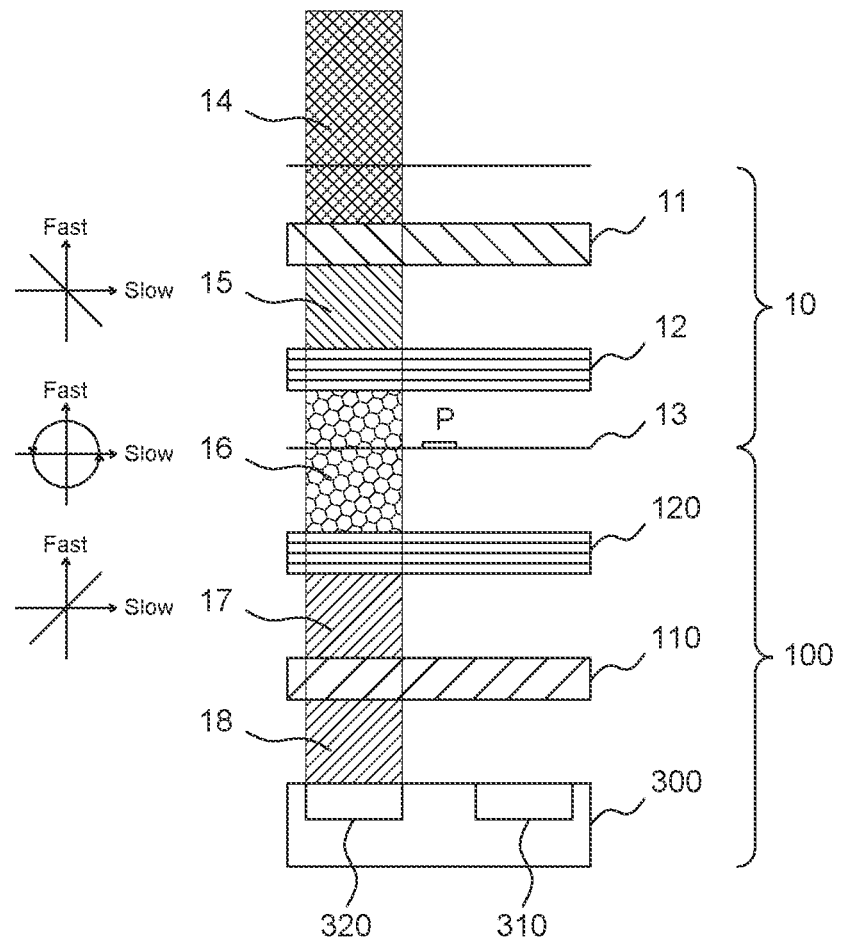
FIG. 2 exemplarily illustrates when sensing light is off in one embodiment of an under-display sensor.

FIG. 2 exemplarily illustrates when sensing light is off in one embodiment of an under-display sensor. In this embodiment, the sensing light off includes not only the continuous off period but also the period between pulses in the modulated on period.

The under-display sensor 100 is disposed under the display 10. The display 10 includes a pixel layer 13 on which a plurality of pixels P for generating light are formed, a display polarization layer 11 and a display retardation layer 12 stacked above the pixel layer 13. On the bottom of the display 10, in order to protect the display polarization layer 11, the display retardation layer 12, and the pixel layer 13, a protective layer formed of a light-opaque material, for example, metal or synthetic resin, may be provided. In one embodiment, the under-display sensor 100 composed of the sensor polarization layer 110, the sensor retardation layer 120, and the optical sensor 300 may be disposed in a region in which a part of the protective layer has been removed (hereinafter, referred as completed structure). In another embodiment, the sensor polarization layer 110 and the sensor retardation layer 120 may be manufactured in the form of a film and attached to the bottom surface of the display 10. The optical sensor 300 may be attached to the bottom surface of the sensor polarization layer 110 to implement an under-display sensor (hereinafter, referred as assembled structure). Hereinafter, in order to avoid duplication of description, a description will be given focusing on the completed structure.

The display polarization layer 11 and the display retardation layer 12 improve visibility of the display 10. The external light 14 incident through the upper surface of the display 10 is unpolarized light. When the external light 14 is incident on the upper surface of the display polarization layer 11, only light substantially coincident with the polarization axis of the display polarization layer 11 passes through the display polarization layer 11. The external light 14 that has passed through the display polarization layer 11 becomes display linearly-polarized light 15 derived from external light. While passing through the display retardation layer 12, the display linearly-polarized light 15 becomes the external light-derived display circularly-polarized light (or elliptically polarized light) 16 rotating clockwise or counterclockwise. When the external light-derived display circularly-polarized light 16 is reflected by the pixel layer 13 and again incident on the display retardation layer 12, it becomes linearly-polarized light. If the polarization axis of the display retardation layer 12 is inclined by about 45 degrees with respect to the slow axis, the polarization axis of the second display linearly-polarized light and the polarization axis of the second linearly-polarized light are perpendicular to each other. For this reason, the linearly-polarized light reflected by the pixel layer 13, that is, the external light, is blocked by the display polarization layer 11 and is prevented from going out of the display. Accordingly, visibility of the display 10 may be improved.

Light incident on the under-display sensor 100 is the external light-derived display circularly-polarized light 16. The external light-derived display circularly-polarized light 16 becomes an external light-derived sensor linearly-polarized light 17 while passing through the first sensor retardation layer 120. The external light-derived sensor linearly-polarized light 17 that has passed through the first sensor polarization layer 110 substantially without loss is referred to as an external light-derived sensor linearly-polarized light 18. The external light-derived sensor linearly-polarized light 18, that is, the external light 14 causes an offset $DC_{offset}$ in the pixel current.

Figure 3:
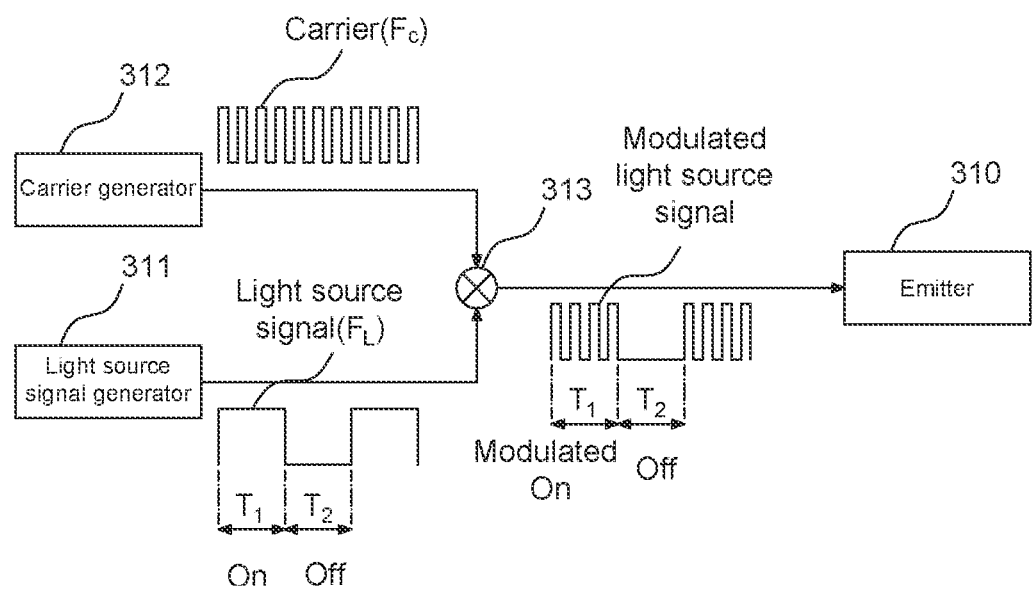
FIG. 3 exemplarily illustrates an emitter driver of an under-display sensor.

FIG. 3 exemplarily illustrates an emitter driver of an under-display sensor.

The emitter driver may include a light source signal generator 311, a carrier generator 312, and a signal modulator 313.

The light source signal generator 311 generates a basic light source driving signal for turning on or off the emitter 310. The basic light source driving signal may be a square wave signal having a frequency $F_L$. The basic light source driving signal includes a continuous on period in which the light source is turned on and a continuous off period in which the light source is turned off. The duration $T_1$ of the continuous on period and the duration time $T_2$ of the continuous off period may be the same or different.

The carrier generator 312 generates a carrier signal for frequency-modulating the basic light source driving signal. The carrier signal may be, for example, a square wave signal having a frequency $F_C$. The frequency $F_C$ may be greater than the frequency $F_L$.

The signal modulator 313 modulates the basic light source driving signal with a carrier signal to generate a modulated light source driving signal. The signal modulator 313 modulates only the continuous on period of the basic light source driving signal. The modulated light source driving signal includes a modulated on period in which the light source is turned on and off with a frequency $F_C$ and a continuous off period in which the light source is turned off. The duration of the continuous on period and the modulated on period are $T_1$, and the duration of the continuous off period is $T_2$.

The emitter 310 irradiates modulated sensing light belonging to, for example, a near-infrared or infrared band by the modulated light source driving signal. The emitter 310 may be, for example, a light emitting diode (LED). The modulated sensing light is a pulsed light that is output with the frequency $F_C$ of the carrier signal only in the modulated on period. Hereinafter, unless otherwise defined, sensing light refers to modulated sensing light, and reflected light refers to modulated sensing light that is reflected by an external object and then has reached the receiver 320.

Figure 4:
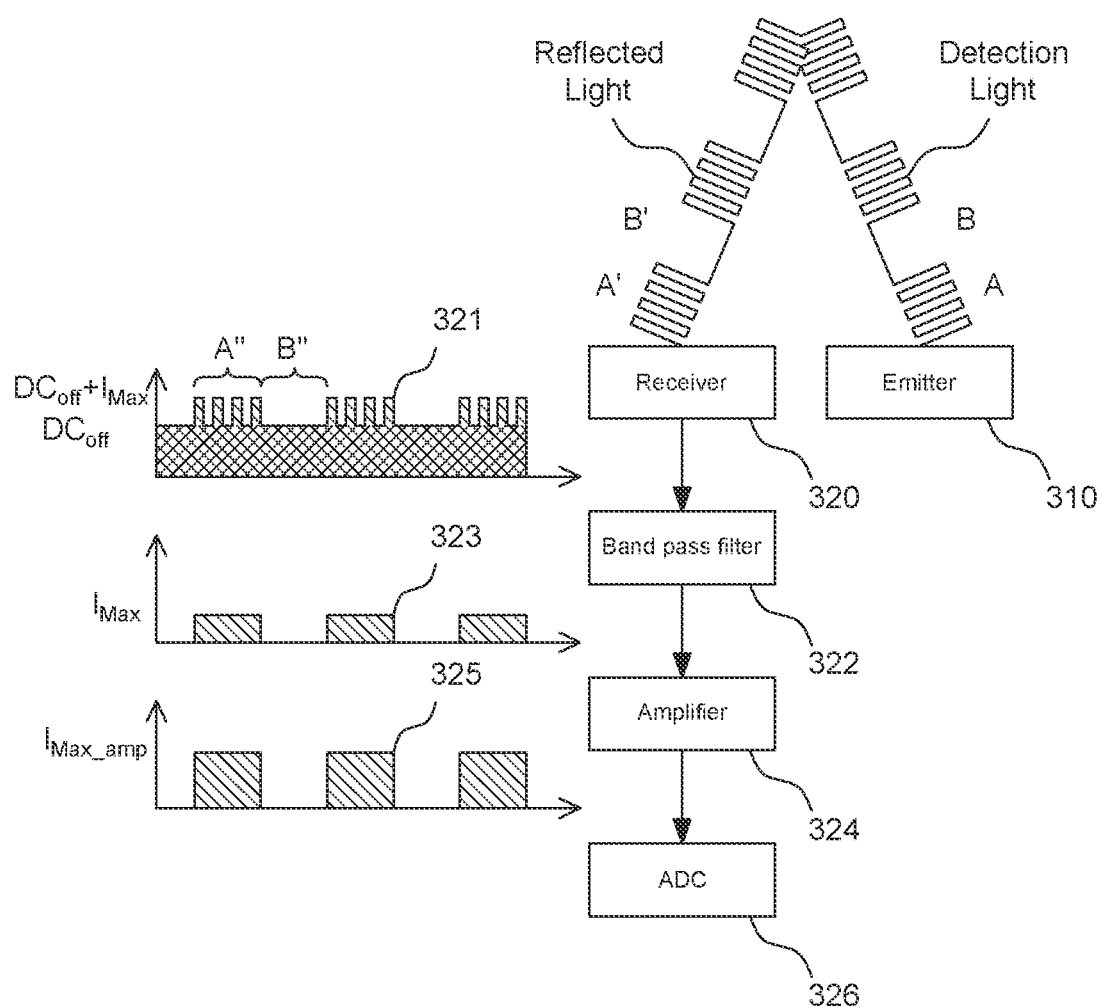
FIG. 4 exemplarily illustrates method of processing modulated sensing light.

FIG. 4 exemplarily illustrates method of processing modulated sensing light.

The emitter 310 irradiates the sensing light described with reference to FIG. 3 toward the bottom of the display. The sensing light incident on the bottom surface of the display propagates toward the outside through the top surface of the display, is reflected by an external object, and enters the top surface of the display again. The sensing light is a pulsed light with frequency $F_C$ belonging to the period A, and two or more periods A are separated by a period B having no pulsed light. Similarly, the reflected light is pulsed light with frequency $F_C$ belonging to the period A', and two or more periods A' are separated by a period B' having no pulsed light. Here, durations of A and A' are $T_1$, and durations B and B' are $T_2$. As will be described in detail below, the sensing light generated by the emitter 310 is unpolarized light, and the reflected light detected by the receiver 320 is polarized light.

The receiver 320 generates a pixel current 321 that is substantially proportional to the brightness of the reflected light, that is, the intensity of light. In use, external light that has passed through the display 10 may enter the under-display sensor 100. The intensity of external light is relatively large compared to the intensity of reflected light, and may be constant for a short period of time, for example, a period A'. Therefore, due to the influence of external light, the pixel current 321 may include an offset current $DC_{offset}$. The pixel current 321 includes a current A" corresponding to the pulsed light and external light detected during the period A' and a current B" corresponding to the external light detected during the period B'. The current A" is a pulsed current in which the minimum value $DC_{offset}$ and the maximum value $I_{max}+DC_{offset}$ are repeated at the frequency $F_C$. $I_{Max}$ is determined by the sensitivity of the receiver 320, and maximum value of the current B" is $DC_{offset}$.

Band pass filter 322 removes the frequency $F_C$ component from the pixel current 321. Pixel current 323 output from the band pass filter 322 may have substantially the same waveform as the basic light source driving signal. That is, the pixel current 323 is output as the maximum value $I_{Max}$ during the continuous on period, and may not be output during the continuous off period.

Amplifier 324 amplifies the pixel current 323 and outputs it to analog-digital converter 326. The pixel current 325 from the amplifier 324 is output as the maximum value $I_{Max\_amp}$ during the continuous on period, and may not be output during the continuous off period.

The analog-to-digital converter 326 converts the pixel current 325 that is an analog signal into a digital signal.

Figure 5:
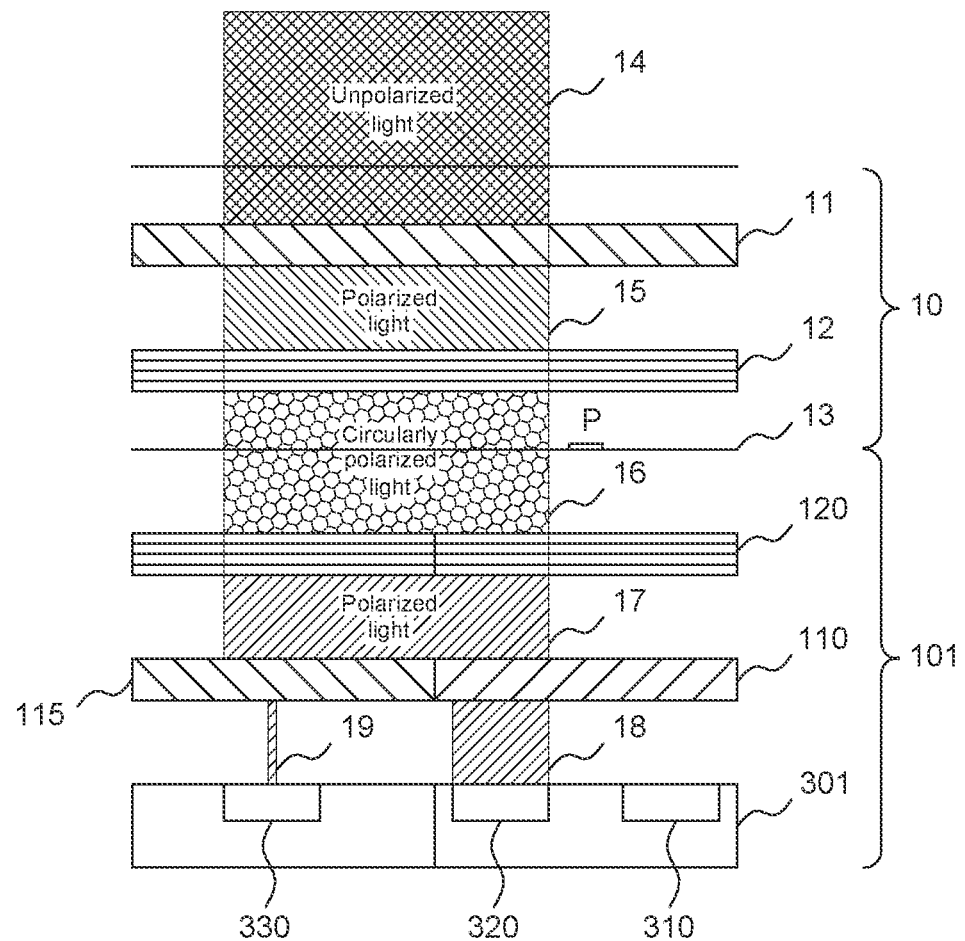
FIG. 5 exemplarily illustrates when sensing light is off in still another embodiment of an under-display sensor.

FIG. 5 exemplarily illustrates when sensing light is off in still another embodiment of an under-display sensor. Periods when the sensing light is off include, not only the continuous off period but also the period between pulses in the modulated on period. The process until the external light 14 passes through the display 10 is similar to that of FIG. 2, and thus a process after the external light 14 enters the under-display sensor 101 will be described.

The under-display sensor 101 includes a first sensor polarization layer 110, a second sensor polarization layer 115 and a first sensor retardation layer 120 that form two optical paths, and an optical sensor 301 configured for detecting light that has passed through each optical path. The optical sensor 301 includes an emitter 310, a first receiver 320, and a second receiver 330.

The first sensor retardation layer 120 is disposed over the first sensor polarization layer 110 and the second sensor polarization layer 115, and the optical sensor 301 is disposed under the first sensor polarization layer 110 and the second polarization layer 115. The emitter 310 and the first receiver 320 of the optical sensor 301 are disposed under the first sensor polarization layer 110, and the second receiver 330 is under the second sensor polarization layer 115. In one embodiment, the first sensor retardation layer 120 may be stacked (laminated) on the upper surfaces of the first sensor polarization layer 110 and the second sensor polarization layer 115. The stacked first sensor retardation layer 120, the first sensor polarization layers 110 and the second sensor polarization layer 115 may be attached to the bottom surface of the display 10. The optical sensor 301 may be attached to the bottom surfaces of the first and second sensor polarization layers 110, 115. In another embodiment, the optical sensor 301 may be implemented with a thin film transistor. Accordingly, the under-display sensor 101 may be manufactured by laminating the first sensor retardation layer 120, the first and second sensor polarization layers 110, 115, and the optical sensor 301, all in the form of a film.

The polarization axis of the first sensor polarization layer 110 and the polarization axis of the second sensor polarization layer 115 are inclined at different angles with respect to the slow axis of the first sensor retardation layer 120. The polarization axis of the first sensor polarization layer 110 is inclined at a first angle, for example, +45 degrees with respect to the slow axis of the first sensor retardation layer 120, and the polarization axis of the second sensor polarization layer 115 is inclined at a second angle, for example, −45 degrees with respect to the slow axis of the first sensor retardation layer 120.

Light incident on the under-display sensor 101 is the display circularly-polarized light 16 derived from external light. The display circularly-polarized light 16 that has passed through the first sensor retardation layer 120 becomes sensor linearly-polarized light 17 derived from external light. The sensor linearly-polarized light 17 that has passed through the first sensor polarization layer 110 substantially without loss is referred to as the first sensor linearly-polarized light 18 derived from external light, and a portion of the sensor linearly-polarized light 17 that has passed through the second sensor polarization layer 115 becomes the second sensor linearly-polarized light 19 derived from external light.

The first sensor retardation layer 120 and the first sensor polarization layer 110 forms the first optical path, and the first sensor retardation layer 120 and the second sensor polarization layer 115 forms the second optical path. The first optical path and the second optical path act differently with respect to the display circularly-polarized light 16. The first optical path allows the display circularly-polarized light 16 to pass through. On the other hand, the second optical path blocks most of the display circularly-polarized light 16 and passes only a portion of it. Hereinafter, although it will be described in detail, as with the external light 14, the first optical path passes the externally-reflected light, and the second optical path blocks the externally-reflected light.

A proportional relationship 1:$K_1$ (here, $K_1$<1) is established between the first sensor linearly-polarized light 18 and the second sensor linearly-polarized light 19. Here, $K_1$ is the transmission blocking ratio of external light. Since the first sensor linearly-polarized light 18 and the second sensor linearly-polarized light 19 are derived from same display circular polarized light 16, but differ only in the optical path, a linear proportional relationship or non-linear proportional relationship in the brightness between the two is established. The nonlinear proportional relationship may be due to various causes, such as a structural characteristic of the display 10 and a wavelength band of the external light 14. The proportional relationship 1:$K_1$ between the first and second sensor linearly-polarized light 18 and 19 may be substantially equally applied to the reflected light 30. That is, the same proportional relationship 1:$K_1$ may be established between the brightness of the reflected light 30 detected by the first receiver 320 and the brightness of the reflected light 30 detected by the second receiver 330.

The first optical path and the second optical path may be adjacent or separated. That is, the first sensor polarization layer 110 and the second sensor polarization layer 115 are disposed under the single sensor retardation layer 120, and the first receiver 320 and the second receiver 330 may be formed on a single sensor 301. Meanwhile, the second receiver 330 may be formed on a separate optical sensor separated from the first receiver 320. The first sensor retardation layer having a slow axis extending parallel to the slow axis of the first sensor retardation layer 120 and the second sensor polarization layer 115 may be disposed over the second receiver 330.

Figure 6:
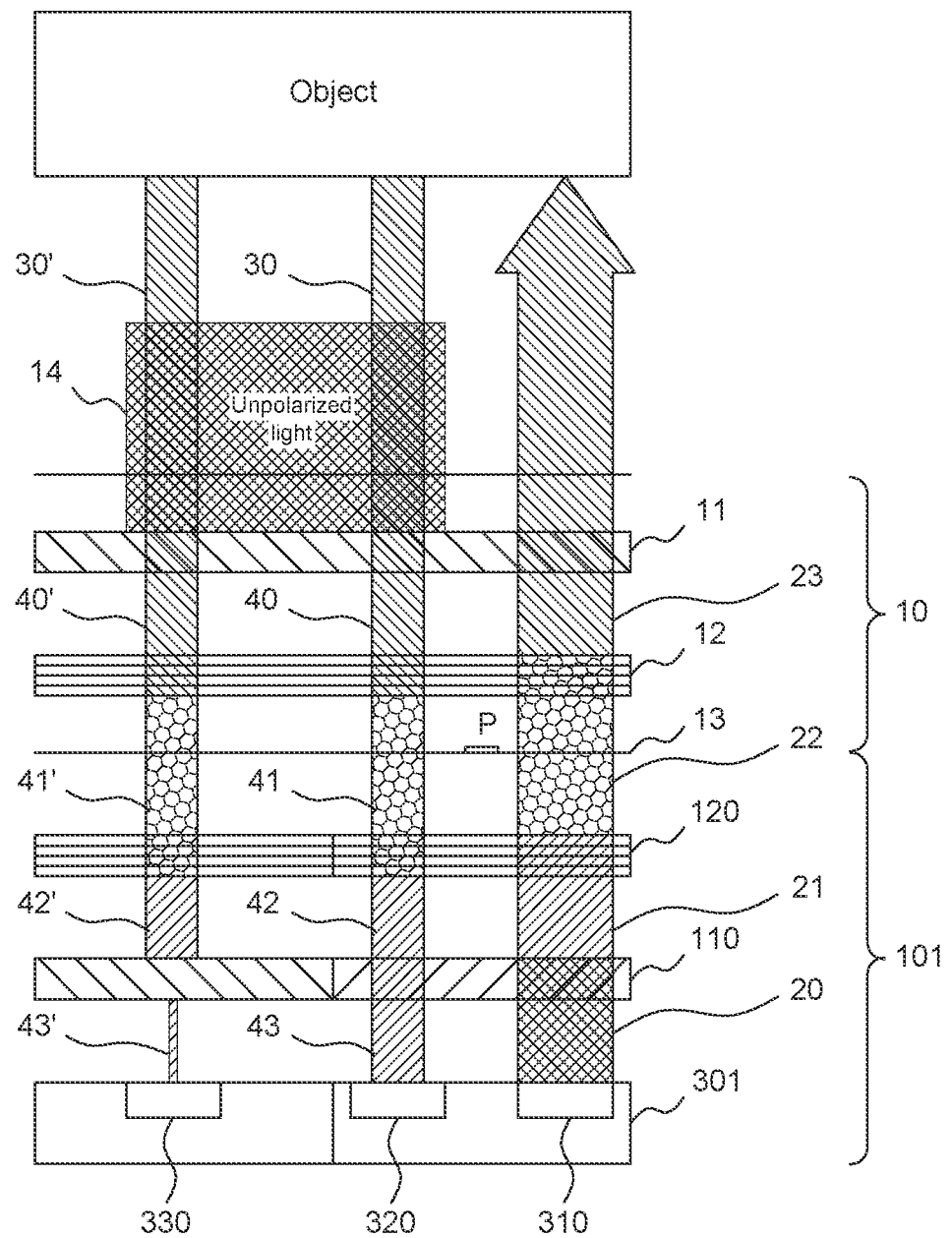
FIG. 6 exemplarily illustrates when the sensing light is on in the configuration illustrated in FIG. 5.

FIG. 6 exemplarily illustrates when the sensing light is on in the configuration illustrated in FIG. 5. When the sensing light is on, it is a modulated on period, excluding a period between pulses. Since the process of the reflected light 30 and 30' reaching the under-display sensor 101 is similar to that of FIG. 5, a process after the reflected light 30 and 30' enters the under-display sensor 101 will be described. Here, it is assumed that there is no internal reflection.

The display circularly-polarized light 41, 41' has passed through the first sensor retardation layer 120 and becomes the first and second sensor linearly-polarized light 42, 42'. As described above, since the slow axis of the display retardation layer 12 and the slow axis of the first sensor retardation layer 120 extend substantially parallel, λ/4 phase difference is added to the first polarization component and the first polarization component of the incident display circularly-polarized light 41, 41', so that the phase difference between them becomes λ/2. Accordingly, the polarization axes of the first and second sensor linearly-polarized lights 42, 42' are rotated by about 90 degrees from the second angle to cause the polarization axis to be inclined at the first angle, for example, +45 degrees with respect to the slow axis of the sensor retardation layer 120.

The first sensor linearly-polarized light 42 has passed through the first sensor polarization layer 110 substantially without loss and propagates to the first receiver 320, while most of the second sensor linearly-polarized light 42' has been blocked by the sensor polarization layer 115 and only a portion of it propagates to the second receiver 330. The first sensor polarization layer 110 may have a polarization axis inclined at the first angle, for example, +45 degrees with respect to the slow axis of the first sensor retardation layer 120. Accordingly, the first sensor linearly-polarized light 42 having a polarization axis inclined at the same angle as the polarization axis of the first sensor polarization layer 110 may pass through the first sensor polarization layer 110. On the other hand, the second sensor polarization layer 115 may have a polarization axis inclined at the second angle, for example, −45 degrees with respect to the first sensor retardation layer 120. Accordingly, the second sensor linearly-polarized light 42' having a polarization axis rotated by 90 degrees with respect to the polarization axis of the second sensor polarization layer 115 is mostly blocked by the second sensor polarization layer 115, and only portion of the second sensor polarization layer 115 may pass through the second sensor polarization layer 115.

The first sensor linearly-polarized light 42 that has passed through the first sensor polarization layer 110 substantially without loss is referred to as a first sensor incident light 43, and the portion of the second sensor linearly-polarized light 42' that has passed the second sensor polarization layer 115 becomes a second sensor incident light 43'. The first sensor incident light 43 includes not only the reflected light 30 but also the sensor linearly-polarized light 18, that is, the external light 14. The second sensor incident light 43' includes the sensor linearly-polarized light 19.

The optical sensor 301 includes the first receiver 320 corresponding to the first optical path and the second receiver 330 corresponding to the second optical path. For example, the first receiver 320 generates a first pixel current that is substantially proportional to the brightness of the first sensor incident light 43, that is, the intensity of light, and the second receiver 330 generates a second pixel current that is substantially proportional to the brightness of the second sensor incident light 43'.

Figure 7:
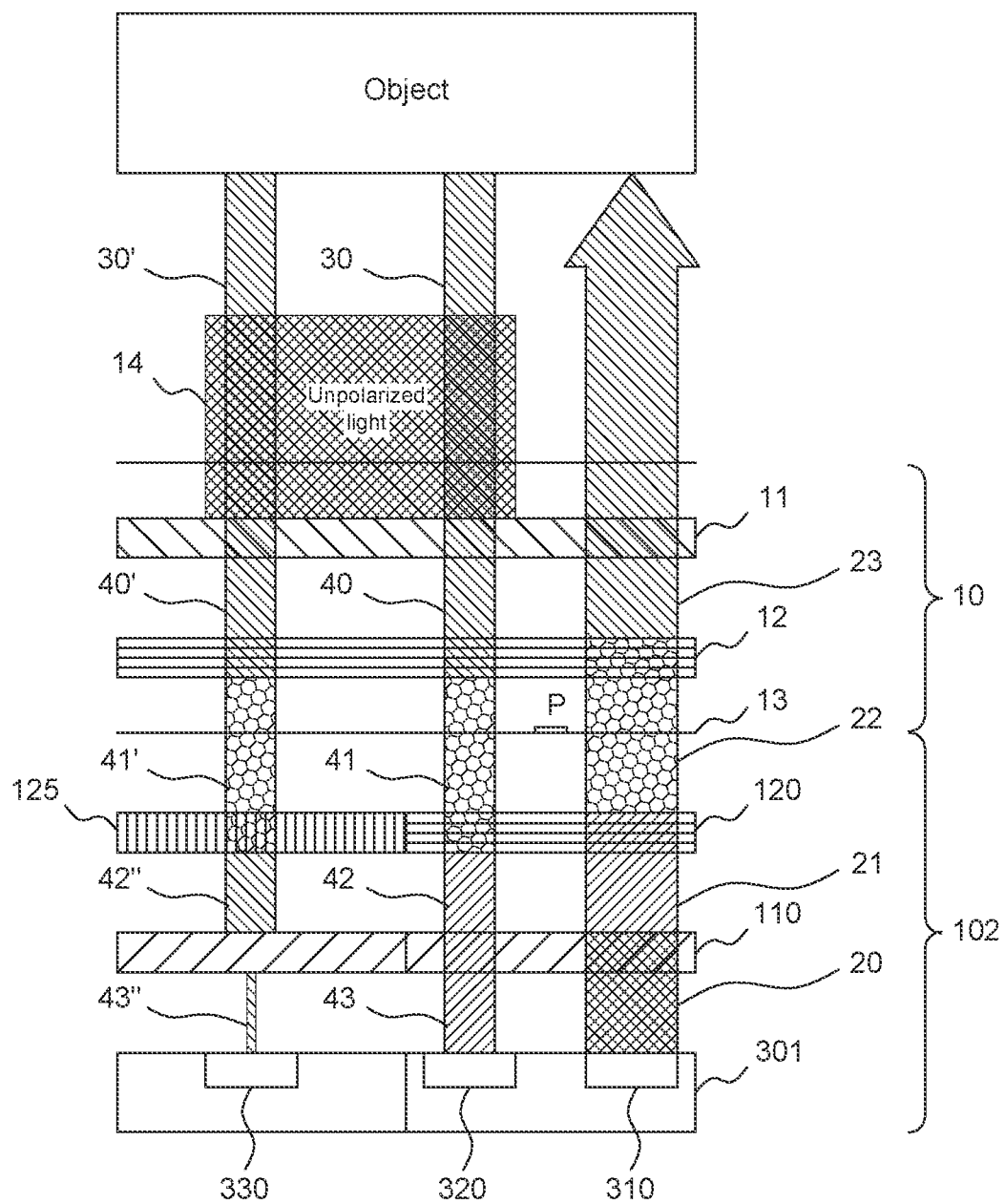
FIG. 7 exemplarily illustrates when sensing light is on in an under-display sensor different from that of FIG. 6.

FIG. 7 exemplarily illustrates when sensing light is on in an under-display sensor different from that of FIG. 6. When the sensing light is on, it is a modulated on period, excluding a period between pulses. Since the process of the reflected light reaching the under-display sensor 102 is similar to that of FIG. 5, a process after the reflected light enters the under-display sensor 102 will be described. Here, it is assumed that there is no internal reflection.

The display circularly-polarized light 41 has passed through the first sensor retardation layer 120 to become the first sensor linearly-polarized light 42, and the display circularly-polarized light 41' has passed through the second sensor retardation layer 125 to become the second sensor linearly-polarized light 42". As described above, since the slow axis of the first sensor retardation layer 120 and the slow axis of the second sensor retardation layer 125 are perpendicular to each other, the polarization axis of the first sensor linearly-polarized light 42 and the polarization axis of the second sensor linearly-polarized light 42" can also be perpendicular to each other. Specifically, the display circularly-polarized light 41 having a phase difference of λ/4 between the first polarization element and the second polarization element may become, by adding a phase difference of λ/4 by the first sensor retardation layer 120, the first sensor linearly-polarized light 42 having the polarization axis substantially parallel to the polarization axis of the polarization layer 110. On the other hand, since the phase difference is eliminated by the second sensor retardation layer 125, the display circularly-polarized light 41' may become the second sensor linearly-polarized light 42" having the polarization axis substantially perpendicular to the polarization axis of the first sensor polarization layer 110.

The first sensor linearly-polarized light 42 has passed through the first sensor polarization layer 110 substantially without loss and propagates to the first receiver 220, whereas most of the second incident sensor linearly-polarized light 42" is blocked by the first sensor polarization layer 110 and only a portion of it propagates to the second receiver 330. The first sensor polarization layer 110 may have the polarization axis that is inclined at the first angle, for example, +45 degrees with respect to the slow axis of the first sensor retardation layer 120 or at the second angle, for example, −45 degrees with respect to the slow axis of the second sensor retardation layer 125. Accordingly, the first sensor linearly-polarized light 42 having the polarization axis inclined at the same angle as the polarization axis of the first sensor polarization layer 110 may pass through the first sensor polarization layer 110. On the other hand, the second incident sensor linearly-polarized light 42" having the polarization axis rotated by 90 degrees with respect to the polarization axis of the first sensor polarization layer 110 is mostly blocked by the first sensor polarization layer 110, and only portion of it may pass through the first polarization layer 110.

The first sensor linearly-polarized light 42 that has passed through the first sensor polarization layer 110 substantially without loss is referred to as the first sensor incident light 43, and the portion of the second sensor linearly-polarized light 42' that has passed the first sensor polarization layer 110 becomes the second sensor incident light 43". The first sensor incident light 43 includes not only the reflected light 30 but also the sensor linearly-polarized light 18, that is, the external light 14. The second sensor incident light 43" includes the sensor linearly-polarized light 19.

The optical sensor 301 includes the first receiver 320 corresponding to the first optical path and the second receiver 330 corresponding to the second optical path. For example, the first receiver 320 generates a first pixel current that is substantially proportional to the brightness of the first sensor incident light 43, and the second receiver 330 generates a second pixel current that is substantially proportional to the brightness of the second sensor incident light 43".

Figure 8:
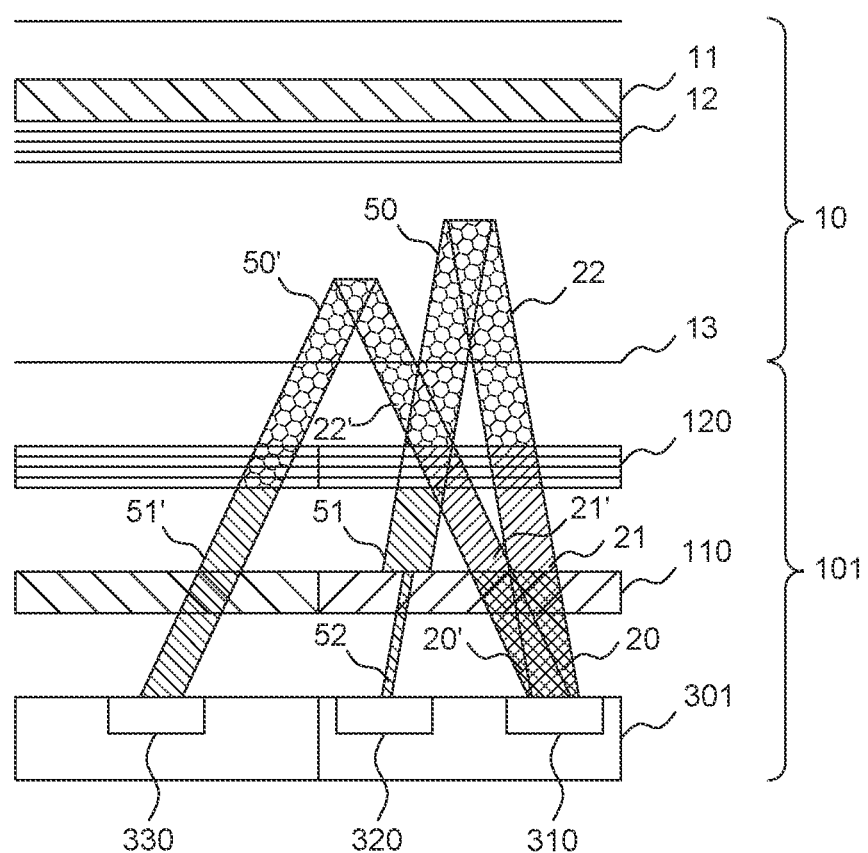
FIG. 8 exemplarily illustrates a case in which light emitted from the under-display sensor is reflected inside a display in still another embodiment of the under-display sensor.

FIG. 8 exemplarily illustrates a case in which light emitted from the under-display sensor is reflected inside a display in still another embodiment of the under-display sensor. It is assumed that there is no externally-reflected light reflected from an external object and returned.

Sensing light reflected from the inside of the display (hereinafter, internally-reflected light) causes a serious error in the brightness of light measured by the first receiver 320 and the second receiver 330. The internally-reflected light differs from the externally-reflected light in various aspects, for example, the brightness (or intensity) of the light, the arrival time of the receiver, and the like. When using the under-display sensor as a proximity sensor, the influence due to internal reflection must be considered.

The sensing light 20, 20' generated by the emitter 310 of the under-display sensor 101 has passed through the first sensor polarization layer 110 and the sensor retardation layer 120 to become the sensor circularly-polarized light for sensing 22, 22'. The sensor circularly-polarized light for sensing 22, 22' may be reflected from the inside of the display 10 and enter the under-display sensor 101 again. Various structures formed of materials that transmit or reflect light are mixed in the display 10. Therefore, some portion of the sensor circularly-polarized light for sensing 22, 22' may be internally reflected and returned to the under-display sensor 101. The first sensing light 20 is emitted at a certain angle to be internally reflected and return to the first receiver 320, and the second sensing light 20' is emitted at a certain angle to be internally reflected and return to the second receiver 330.

The sensor circularly-polarized light 50 that is internally reflected becomes the sensor linearly-polarized light 51 that is internally reflected by the first sensor retardation layer 120. The polarization axis of the sensor linearly-polarized light 51 rotates about 90 degrees from the polarization axis of the sensor linearly-polarized light for sensing 21. Accordingly, the polarization axis of the sensor linearly-polarized light 51 is substantially perpendicular to the polarization axis of the first sensor polarization layer 110, and most of the sensor linearly-polarized light 51 may be blocked by the first sensor polarization layer 110. The sensor linearly-polarized light 52 that has passed without being blocked may be detected by the first receiver 320.

On the other hand, the sensor circularly-polarized light 50' becomes the sensor linearly-polarized light 51' that is internally reflected by the first sensor retardation layer 120. The polarization axis of the sensor linearly-polarized light 51' rotates about 90 degrees from the polarization axis of the sensor linearly-polarized light for sensing 21. Accordingly, the polarization axis of the sensor linearly-polarized light 51' becomes substantially parallel to the polarization axis of the second sensor polarization layer 115 and may pass through the second sensor polarization layer 115.

Due to the sensor linearly-polarized light 51' passing through without being blocked, a proportional relationship $K_2:1$ (here, $K_2<1$) between the brightness detected by the first receiver 320 and the second receiver 330 is established. Here, $K_2$ is the transmission blocking ratio of internal reflection.

The external light transmission blocking ratio $K_1$ and the internal reflection transmission blocking ratio $K_2$ are used to correct the brightness of the first sensor incident light 43 measured by the under-display sensor 101. When the under-display sensor 101 operates as a proximity sensor, not only the first sensor incident light 43 and the second sensor incident light 43', but also the internally-reflected sensing light 52, 51' are also incident on the first receiver 320 and the second receiver 330. Due to the internally-reflected sensing light 52 incident on the first receiver 320 as well as the internally-reflected sensing light 51' incident on the second receiver 330, an error may occur in measurements of the receivers 320 and 330.

When the brightness of the first sensor incident light 43 is A, the brightness of the second sensor incident light 43' is $K_1 \times A$. On the other hand, if the brightness of the internally-reflected sensing light 51' is B, the brightness of the internally reflected sensing light 52 is $K_2 \times B$.

The brightness C of the light detected by the first receiver 320 corresponds to the first sensor incident light 43 and the internally-reflected sensing light 52.

$$C = A + K_2 \times B \qquad \text{<Equation 1>}$$

Meanwhile, the brightness D of the light detected by the second receiver corresponds to the second sensor incident light 43' and the internally-reflected sensing light 51'.

$$D = K_1 \times A + B \qquad \text{<Equation 2>}$$

From Equation 1 and Equation 2, the brightness A of the first sensor incident light 43 may be calculated as follows.

$$A = \frac{(C - D \times K_2)}{(1 - K_1 \times K_2)} \quad \langle\text{Equation 3}\rangle$$

The brightness of the first sensor incident light 43 is used to calculate a distance to an external object or to determine whether or not it is close.

Figure 9:
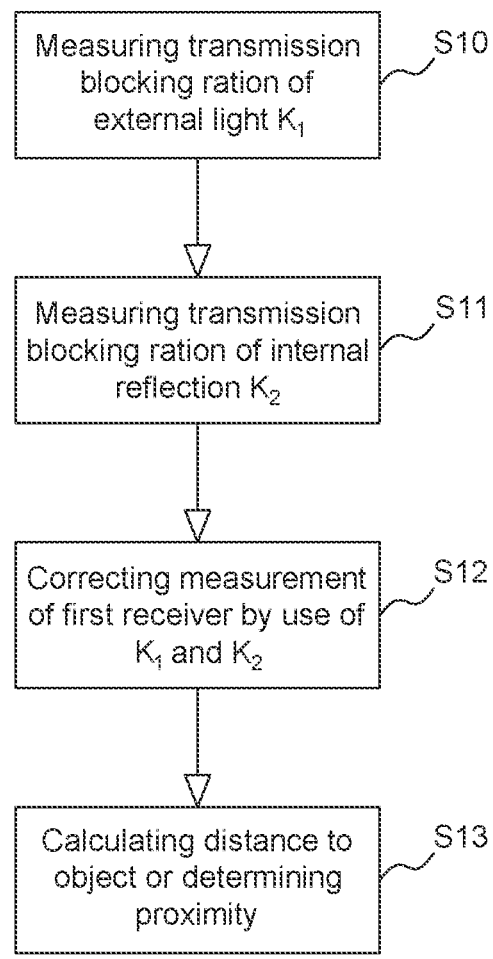
FIG. 9 is a flowchart for exemplarily illustrating method of removing an effect of internal reflection.

FIG. 9 is a flowchart exemplarily illustrating a method of removing an effect of internal reflection.

The first receiver 320 may detect not only the sensor linearly-polarized light 32 derived from the sensing light 20 but also the linearly-polarized light caused by internal reflection. Linearly-polarized light due to internal reflection may cause a serious error in the measurements of the under-display sensor. Therefore, in order to improve the accuracy of the under-display sensor, the brightness detected by the first receiver 320 needs to be corrected.

In the configurations illustrated in FIG. 6 or FIG. 7, the transmission blocking ratio $K_1$ of external light is measured (S10). The transmission blocking ratio $K_1$ may be calculated by use of the brightness of the first sensor linearly-polarized light 18 incident on the first receiver 320 and the second receiver 330 with the emitter 310 turned off. While adjusting the brightness of the external light 14 or the position of the under-display sensors 100, 101, 102, a plurality of transmission blocking ratios $K_1$ may be calculated.

The transmission blocking ratio $K_2$ of the internal reflection is measured (S11). The transmission blocking ratio $K_2$ may be calculated by use of the brightness of the internally-reflected sensor linearly-polarized light 51 incident on the first receiver 320 and the brightness of a portion of the internally-reflected sensor linearly-polarized light 51' incident on the second receiver 330 in the absence of external light. While adjusting the brightness of the sensing light 20 or the position of the under-display sensors 100, 101, 102, a plurality of transmission blocking ratios $K_2$ may be calculated.

The measured external light transmission blocking ratio $K_1$ and the internal reflection transmission blocking ratio $K_2$ are used to correct the brightness of the first sensor incident light 43 measured by the under-display sensors 100, 101, 102 (S12). When the under-display sensors 100, 101, 102 operate as a proximity sensor, not only the first sensor incident light 43 and the second sensor incident light 43', but also the internally-reflected sensing light 51', 52 are incident on the first receiver 320 and the second receiver 330. Due to the internally-reflected sensing light 52 incident on the first receiver 320 as well as the internally-reflected sensing light 51' incident on the second receiver 330, error may occur in the measurement by the receivers 320, 330.

When the brightness of the first sensor incident light 43 is A, the brightness of the second sensor incident light 43' is $K_1 \times A$. On the other hand, if the brightness of the internally-reflected sensing light 51', 51" is B, the brightness of the internally reflected sensing light 52 is $K_2 \times B$.

The brightness C of the light detected by the first receiver 320 corresponds to the first sensor incident light 43 and the internally-reflected sensing light 52.

$$C = A + K_2 \times B \quad \langle\text{Equation 4}\rangle$$

Meanwhile, the brightness D of the light detected by the second receiver corresponds to the second sensor incident light 43' and the internally-reflected sensing light 51'.

$$D = K_1 \times A + B \quad \langle\text{Equation 5}\rangle$$

From Equation 4 and Equation 5, the brightness A of the first sensor incident light 43 may be calculated as follows.

$$A = \frac{(C - D \times K_2)}{(1 - K_1 \times K_2)} \quad \langle\text{Equation 6}\rangle$$

The brightness of the first sensor incident light 43 is used to calculate a distance to an external object or to determine whether or not it is close (S13).

Figure 10A:
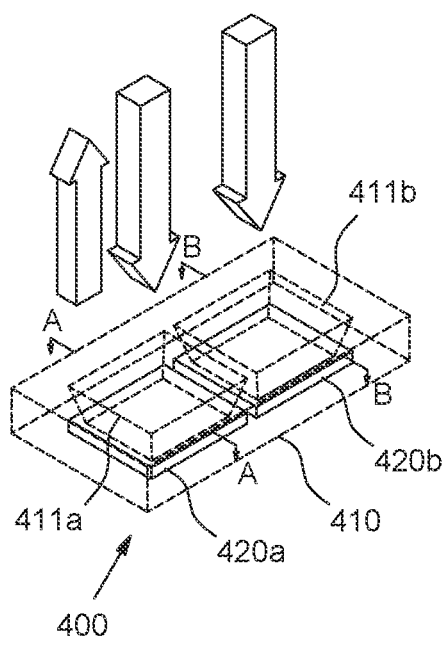
FIGS. 10A and 10B exemplarily illustrate a need to drive two or more separated under-display sensors simultaneously.
Figure 10B:
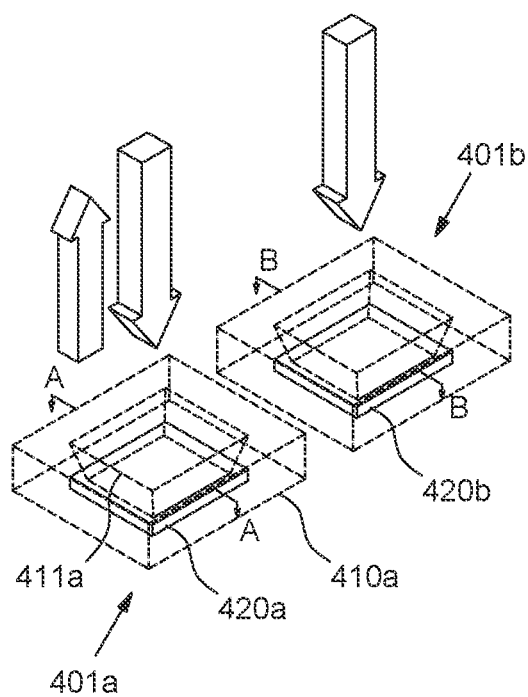
Figure 11A:
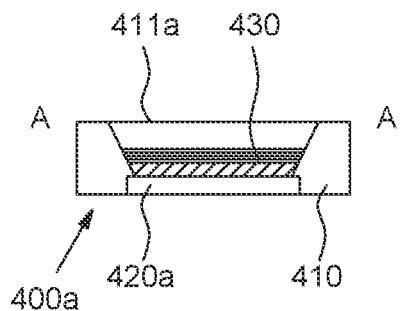
FIGS. 11A-11E exemplarily illustrate cross-sections along AA and BB of FIG. 10.
Figure 11D:
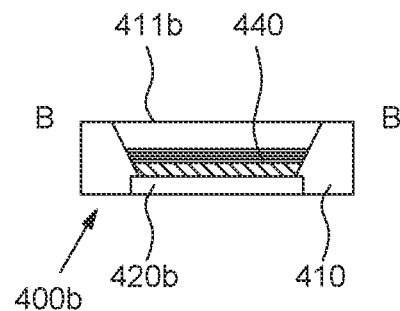
Figure 11B:
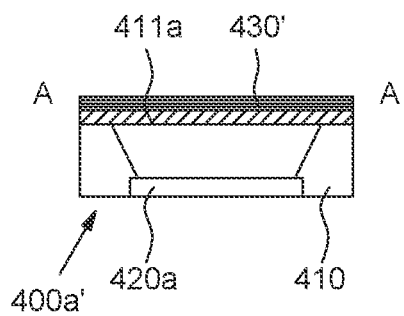
Figure 11E:
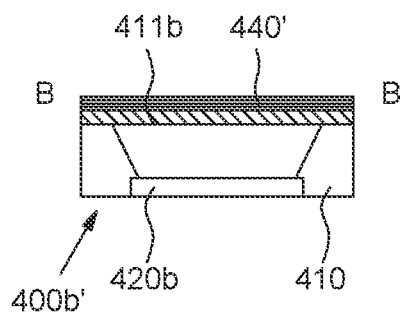
Figure 11C:
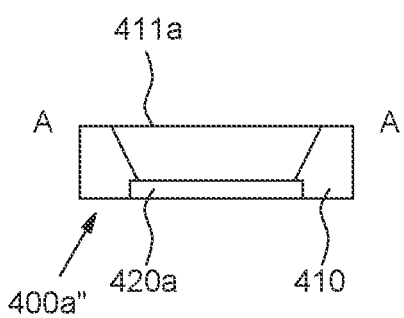

FIG. 10 exemplarily illustrates a need to drive two or more separated under-display sensors simultaneously.

Simultaneous driving is required in under-display sensors operating in an environment in which the object to be detected is affected by temporally changing noise. The under-display sensor detects not only reflected light but also noise such as external light, internally-reflected sensor circular polarization, and light incident from the display. Therefore, since the measurements are affected not only by reflected light but also by noise, in order to measure the intensity of reflected light alone, a plurality of sensors are disposed under the display, and in particular, it is necessary to be driven simultaneously. Compared to reflected light that is kept relatively constant, the intensity of noise may vary within a few to tens of microseconds. Therefore, even when a plurality of sensors are used, if the operating time is different for each sensor, the measurements are different for each sensor, and the noise cannot be removed from the measurements. It goes without saying that the simultaneous driving method proposed in the present specification can be applied not only to under-display sensors, but also to other types of semiconductor devices supporting I²C communication.

Referring to FIG. 10, the under-display sensor may be implemented in various configurations. The first type of sensor 400 includes a plurality of chips 420a, 420b in one packaging 410. The second type of sensor 401a includes one chip 420a in one packaging 410a. The packaging 410 of the first type of sensor 400 includes a plurality of through holes 411a, 411b for exposing the chips 420a, 420b to the outside. The packaging 410a of the second type of sensor 401a includes one through hole 411a for exposing the chip 420a to the outside.

Basically, the chips 420a, 420b may have a function of measuring the intensity of reflected light and noise in common. However, the characteristics of light incident on each of the chips 420a, 420b may be different. In one embodiment, in the sensor 400 of the first type, the chips 420a, 420b receive both reflected light and noise, but the first chip 420a receives substantially lossless reflected light and noise (both have passed through the first optical path), and the second chip 420b receives reflected light and noise (both have passed through the first optical path) having an intensity proportional to the intensity of the light received by the first chip 420a. Similarly, in the second type of sensor 401a, 401b, the chip 420a of the sensor 401a receives substantially lossless reflected light and noise, and the chip 420b of the sensor 401b receives reflected light and noise having an intensity proportional to the intensity of light received by the first chip 420a.

In the first and second types of sensors 400, 401a, 401b, the operating of the chips 420a, 420b is substantially synchronized. That is, an operating start time and an operating end time of the chips 420a, 420b are substantially the same. This is because the influence of noise can be removed from the measurements only when the chips 420a, 420b receive the same noise.

The first and second types of sensors 400, 401a, 401b are substantially, except for the difference between whether the first optical path and the second optical path are implemented in one packaging or in each packaging, they are the same sensor. Therefore, in the following description, the first type of sensor 400 will be mainly described.

FIG. 11 exemplarily illustrates cross-sections along AA and BB of FIG. 10, and (a), (b), and (c) are cross-section for receiving light passing through the first optical path, and (d) and (e) show cross-section for receiving light passing through the second optical path.

Referring to (a) of FIG. 11, the first sensor 400*a* includes a packaging 410, a first light selection layer 430, and the first chip 420*a*. The first light selection layer 430 forms the first optical path and may be disposed over the upper surface of the first chip 420*a*. The first light selection layer 430 covers at least the photo cell area of the first chip 420*a*. The first light selection layer 430 and the photo cell area may receive reflected light and/or noise incident from the display through the through hole 411*a*.

Referring to (b) of FIG. 11, the first sensor 400*a'* includes the packaging 410, a first light selection layer 430', and the first chip 420*a*. The first light selection layer 430' forms the first optical path and may be disposed over the upper surface of the packaging 410. The first light selection layer 430' covers at least the through hole 411*a*.

Referring to (d) of FIG. 11, the second sensor 400*b* includes the packaging 410, a second light selection layer 440, and the second chip 420*b*. The second light selection layer 440 may form the second optical path and may be disposed over the upper surface of the second chip 420*b*. Here, the second light selection layer 440 covers at least the photo cell area of the second chip 420*b*. The second light selection layer 440 and the photo cell area may receive reflected light and/or noise incident from the display through the through hole 411*b*.

Referring to (e) of FIG. 11, the second sensor 400*b'* includes the packaging 410, a second light selection layer 440', and the second chip 420*b*. The second light selection layer 440' forms the second optical path and may be disposed over the upper surface of the packaging 410. The second light selection layer 440' covers at least the through hole 411*b*.

Referring to (c) of FIG. 11, the first sensor 400*a"* includes the packaging 410 and the first chip 420*a*. As described above, the first chip 420*a* and the second chip 420*b* may remove the effect of noise by using a difference in measurements for reflected light and noise received within the same operating period. Therefore, if there is only a proportional relationship between the measurements of the first chip 420*a* of the first sensor 400*a"* and the second chip 420*b* of the second sensors 400*b*, 400*b'*, the first sensor 400*a"* does not need to include the light selection layer 430 or 430'.

The first light selection layer 430 and the first light selection layer 430' provide the same function, that is, the first optical path, but may have different structures, and the second light selection layer 440 and the second light selection layer 440' also provide the second optical path, but may have a different structure. The first light selection layers 430, 430' may include the first sensor retardation layer 120 and the first sensor polarization layer 110, as described with reference to FIGS. 5 through 7. Meanwhile, the first light selection layers 430, 430' may include the second sensor retardation layer 125 and the second sensor polarization layer 115. The second light selection layers 440, 440' may include the first sensor retardation layer 120 and the second sensor polarization layer 115 as described with reference to FIGS. 5 to 7. Meanwhile, the second light selection layers 440, 440' may include the second sensor retardation layer

125 and the first sensor polarization layer 110. The examples shown in FIG. 11 are only for explaining that the light selection layers 430, 430', 440, 440' may be disposed at various locations, and does not limit that a specific structure should be disposed at a specific location.

Figure 12A:
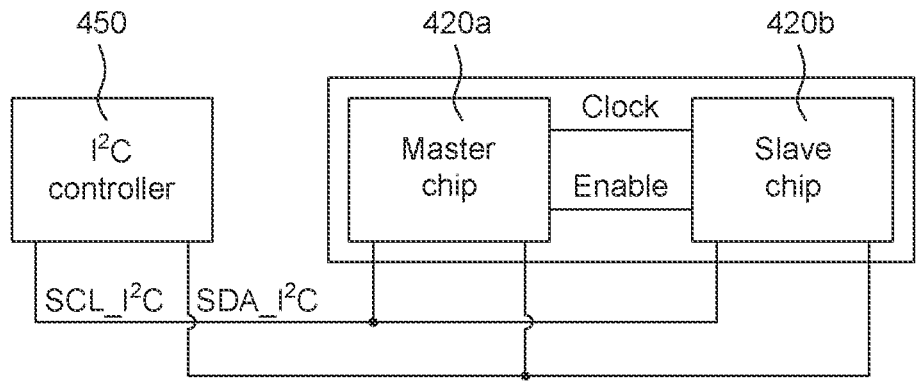
FIGS. 12A and 12B exemplarily illustrate a configuration for simultaneously driving a plurality of chips.
Figure 12B:
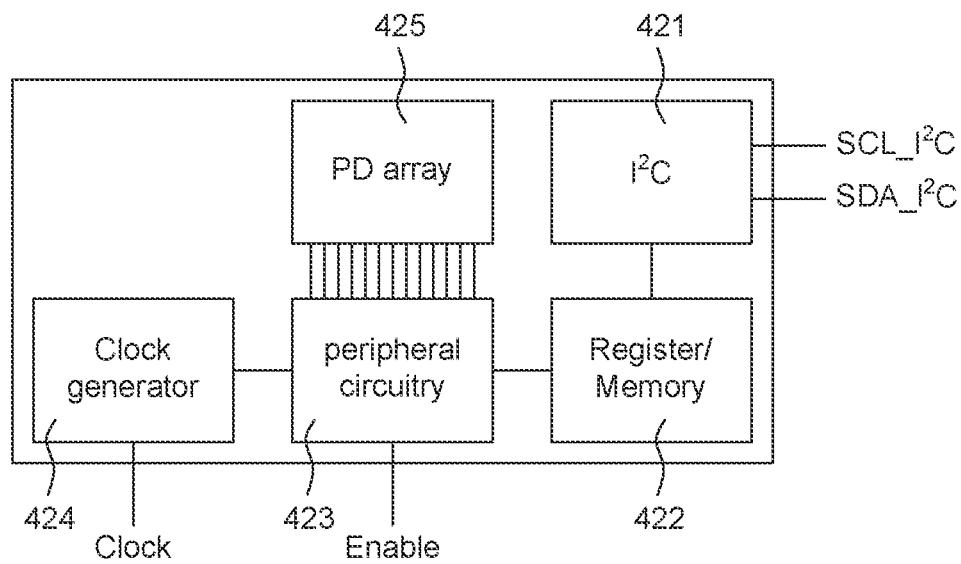

FIG. 12 exemplarily illustrates a configuration for simultaneously driving a plurality of chips, in which (a) shows two chips and a controller that drives them, and (b) shows a functional configuration of the chip.

Referring to (a) of FIG. 12, two chips are set in a master mode and a slave mode, and the chip 420*a* (hereinafter, referred to as a master chip) set as a master mode provides an operating start signal Enable required for simultaneous operating start to the chip 420*b* (hereinafter, referred to as a slave chip) set as a slave mode. Meanwhile, one of the two chips may provide an operating clock Clock required for simultaneous operating end to another chip.

Simultaneous driving means that the operating start time are same and the operating end time are the same. In order for the operating start time to be the same, any one of the plurality of chips must be able to notify the remaining chips of the operating start, and for the operating end time to be the same, the plurality of chips must be driven by the same clock. To this end, the chips 420*a*, 420*b* include an enable input/output pad for inputting/outputting the operating start signal Enable and a clock input/output pad for inputting/outputting the operating clock Clock as well as pads for inputting or outputting a signal required for basic driving control. Additionally or alternatively, the chips 420*a*, 420*b* may further include one or more option pads for determining the master mode or the slave mode. Using the option pad, the operation mode of each chip can be determined in advance.

The pad or contact (hereinafter, referred to as a pad) is a metal layer or terminal formed on the upper or lower surface of the chip. The pad is electrically connected to a lead frame, a printed circuit board (PCB), etc. by various means such as wires and solder balls, and is for receiving a signal from the outside or transmitting a signal to the outside through the lead frame. When the plurality of chips 420*a*, 420*b* are included in one packaging 410, for example, the enable input/output pads can be directly connected by wiring, or if the chips 420*a*, 420*b* are attached to the PCB, they can be connected indirectly by the PCB. When one chip 420*a* is included in one packaging 410*a*, for example, enable input/output pads may be electrically connected through lead frames. In summary, signal transmission between two chips through the enable input/output pad and/or the clock input/output pad is not dependent on the electrical connection method between the pads.

The master chip 420*a* and the slave chip 420*b* may communicate with the controller 450 through data line SDA_I²C and one clock line SCL_I²C. The controller 450 designates any one of a plurality of chips having substantially the same function as the master chip 420*a* and the remaining chips as the slave chip 420*b*. The master chip 420*a* provides the operating start signal Enable for controlling driving of the slave chip 420*b* to the plurality of slave chips 420*b* through the enable input/output pads. The controller 450 may control the operating start of one master chip 420*a*, thereby enabling the operating start of the plurality of slave chips 420*b*.

Meanwhile, the operating clock Clock may be provided by the master chip 420*a* to the slave chip 420*b* or may be provided externally. When the operating clocks are different for each of the plurality of chips, the operating end time may be also different. Therefore, in order to simultaneously drive a plurality of chips, the plurality of chips must be driven by substantially the same operating clock Clock. To this end, the master chip 420a provides the operating clock Clock to the plurality of slave chips 420b through a clock input/output pad, or the master chip 420a and the slave chip 420b can be provided the operating clock Clock externally through the clock input/output pads.

The master chip 420a and the slave chip 420b are semiconductors having substantially the same function, and as described with reference to FIGS. 10 and 11, only detection targets may be different. Referring to (b) of FIG. 12, the master chip 420a and the slave chip 420b may include an I²C communication unit 421, a register/memory 422, a peripheral circuit 423, a clock generator 424, and a photo cell area 425.

The I²C communication unit 421 receives a control signal from the controller 450 through the data line SDA_I²C and the clock line SCL_I²C, and transmits data generated by the chips 420a, 420b to the controller 450. During I²C communication, the controller 450 transmits a unique chip address allocated for each chip through the data line SDA_I²C, and the I²C communication unit 421 of the chip having the corresponding chip address transmits the response signal Ack through the data line SDA_I²C to the controller 450, but the communication unit 421 of the remaining chips does not transmit the response signal. The controller 450 transmits register address and/or data to be stored in the corresponding register address to the I²C communication unit 421 of the responding chip through the data line SDA_I²C. The I²C communication unit 421 stores the received data in the register address on the register/memory 422, and the peripheral circuit 423 is driven by the stored data. Meanwhile, the I²C communication unit 421 transmits the measurements stored in the register/memory 422 to the controller 450 through the data line SDA_I²C under the control of the controller 450.

The register/memory 422 has an address for identifying a storage location and a data storage area allocated for each address. The register/memory 422 does not need to be physically configured as one, and if necessary, the registers are embedded in the peripheral circuit 423, and the memory can be separated from the peripheral circuit 423.

The peripheral circuit 423 refers to circuits for controlling the driving of a chip, such as a driver for driving the photo cell area, a readout for reading pixel currents from the photo cell area, and an ADC for converting pixel currents into measurements. That is, the peripheral circuit 423 drives the photo cell area 425 according to the data stored in the register address on the register/memory 422 to generate analog pixel currents corresponding to the intensity of incident light and convert into digital measurements and to store in the register/memory 422. In particular, the peripheral circuit 423 is driven in the master mode or the slave mode under the control of the controller 450. When set to the master mode, the peripheral circuit 423 provides the operating start signal Enable to the slave chip 420b. Additionally, the peripheral circuit 423 may provide the operating clock Clock to the slave chip 420b. On the other hand, when set to the slave mode, the peripheral circuit 423 starts operating by the operating start signal Enable received from the master chip 420a, and is driven for a time corresponding to a certain number of operating clocks Clock. Clock Clock may be provided from the master chip 420a or externally.

The clock generator 424 generates the operating clock Clock. When the operating clock Clock is provided externally, the clock generator 424 may be omitted. When the master chip 420a provides the operating clock, the clock generator 424 of the slave chip 420b may be deactivated by the peripheral circuit 422, or the peripheral circuit 422 may operate with the operating clock Clock input through the clock input/output pad.

The photo cell area 425 is composed of a plurality of receivers 320, 330. The receivers 320, 330 may be, for example, photodiodes, but may be replaced with various light receiving devices. The receivers 320, 330 generate pixel currents corresponding to the incident light.

Figure 13:
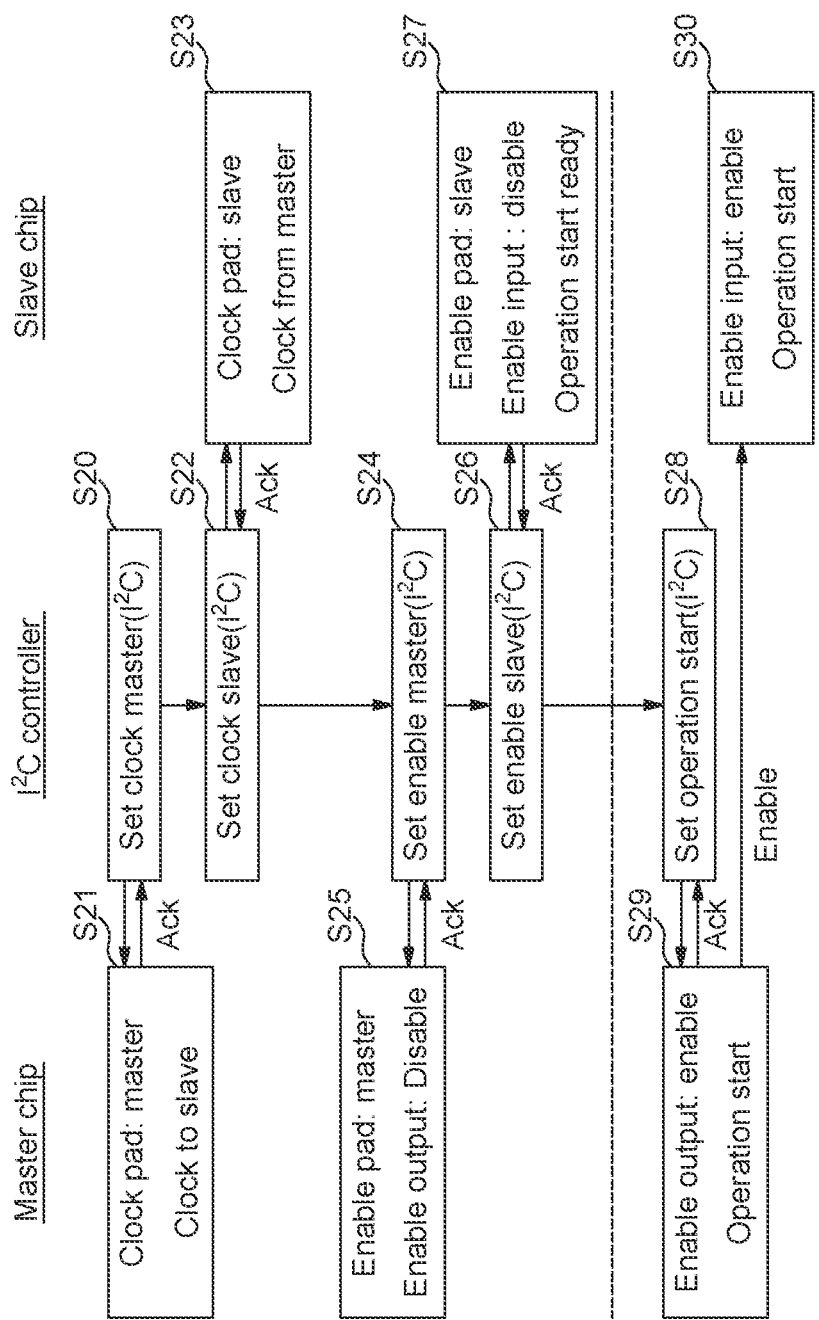
FIG. 13 exemplarily illustrates method of simultaneously driving a plurality of chips in the configuration illustrated in FIG. 12.

FIG. 13 exemplarily illustrates method of simultaneously driving a plurality of chips in the configuration illustrated in FIG. 12.

The method of driving a plurality of chips includes a master/slave setting process (S20 to S27) of setting one of the plurality of chips to the master mode and the remaining chips to the slave mode, and an operating start process (S28 to S30) of starting simultaneous driving the master chip 420a and the slave chip 420b. If the master chip 420a and the slave chip 420b are predetermined by the option pad, all of the master/slave setting process (S20 to S27) or a clock master/clock slave setting process (S20 to S23) in the master/slave setting process may be omitted.

Referring to FIG. 13, the controller 450 sets any one of a plurality of chips as a clock master (S20). The controller 450 transmits a chip address of a chip to be set as the clock master, a first register address, and a first register value (data) indicating the clock master to be stored in the first register address through the data line SDA_I²C.

The chip designated as the clock master stores the first register value in the first register address and then transmits the response signal Ack through the data line SDA_I²C (S21). The chip designated as the clock master provides the operating clock Clock through the clock input/output pad.

The controller 450 sets the remaining chips that are not set as the clock master among the plurality of sensors as clock slaves (S22). The controller 450 transmits a chip address of a chip to be set as the clock slave, the first register address, and a second register value indicating the clock slave to be stored in the first register address through the data line SDA_I²C.

The chip designated as the clock slave stores the second register value in the first register address and then transmits the response signal Ack through the data line SDA_I²C (S23). The chip designated as the clock slave receives the drive clock Clock through the clock input/output pad.

If a plurality of chips are provided with the same operating clock Clock externally, S20 to S23 may be omitted.

The controller 450 sets any one of the plurality of chips as an enable master (master chip) (S24). The controller 450 transmits a chip address of the master chip 420a, a second register address, and a third register value indicating the enable master to be stored in the second register address through the data line SDA_I²C.

After storing the third register value in the second register address, the master chip 420a transmits the response signal Ack through the data line SDA_I²C (S25). The master chip 420a provides an operating standby signal Disable through the enable input/output pad.

The controller 450 sets the remaining chips that are not set as the enable master among the plurality of sensors as enable slaves (slave chips) (S26). The controller 450 transmits a chip address of the slave chip 420b, the second register address, and a fourth register value indicating the enable slave to be stored in the second register address through the data line SDA_I2C.

After storing the fourth register value in the second register address, the slave chip 420b transmits the response signal Ack through the data line SDA_I²C (S27). The slave chip 420*b* receives the operating standby signal Disable through the enable input/output pad. Accordingly, the slave chip 420*b* enters an operating standby state.

In one embodiment, the clock master and the enable master may be the same chip. In this case, S24 and S25 may be omitted, and a chip set as the clock master may output the operating clock Clock through the clock input/output pad and simultaneously output the operating standby signal Disable through the enable input/output pad. Meanwhile, in another embodiment, the clock master and the enable master may be different chips. In this case, the clock master may be set as the enable slave and may be driven by receiving the operating start signal Enable from the enable master, or may provide only a clock to the clock slave. That is, the clock master may be a clock generator connected to a plurality of chips through clock input/output pads.

When the controller 450 commands the master chip 420*a* to start operating (S28), the master chip 420*a* provides the operating start signal Enable to the slave chip 420*b* through the enable input/output pad (S29). The operating start command may include a chip address of the master chip 420*a*, the third register address, and a fifth register value indicating the operating start to be stored in the third register address. Accordingly, a plurality of chips designated as the master chip 420*a* and the slave chip 420*b* can start operating simultaneously.

Figure 14:
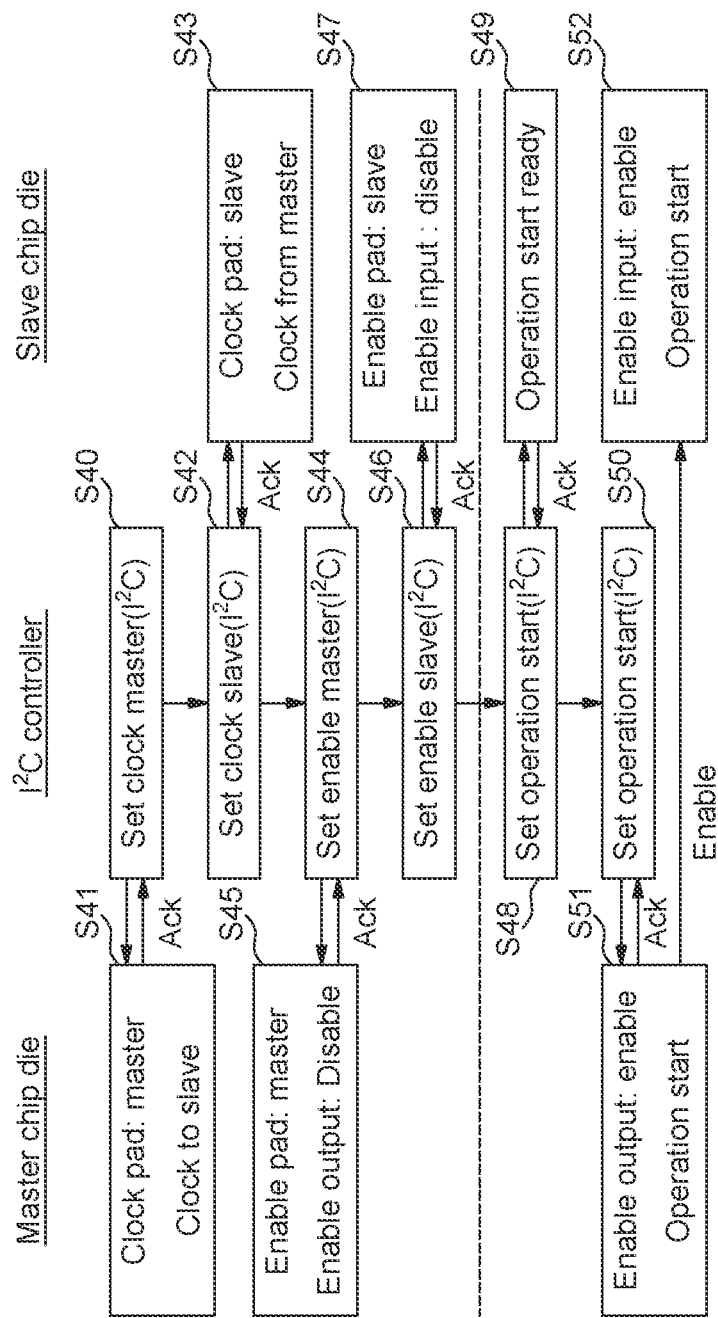
FIG. 14 exemplarily illustrates another method of simultaneously driving a plurality of chips in the configuration illustrated in FIG. 12

FIG. 14 exemplarily illustrates another method of simultaneously driving a plurality of chips in the configuration illustrated in FIG. 12. Since S40 to S47 are the same as S20 to S27 of FIG. 13, same description will be omitted.

When the controller 450 commands the slave chip 420*b* to start operating (S48), the slave chip 420*b* transmits the response signal Ack and enters the operating standby state (S49). The operating start command may include the chip address of the slave chip 420*b*, the third register address, and the fifth register value indicating the operating start to be stored in the third register address. That is, the controller 450 commands the slave chip 420*b* to drive, and after receiving the operating start command from the controller 450, the slave chip 420*b* waits until receiving the operating start signal Enable from the master chip 420*a*.

When the controller 450 commands the master chip 420*a* to start operating (S50), the master chip 420*a* provides the operating start signal Enable to the slave chip 420*b* through the enable input/output pad (S51). Accordingly, the plurality of chips designated as the master chip 420*a* and the slave chip 420*b* can start to drive simultaneously.

Figure 15A:
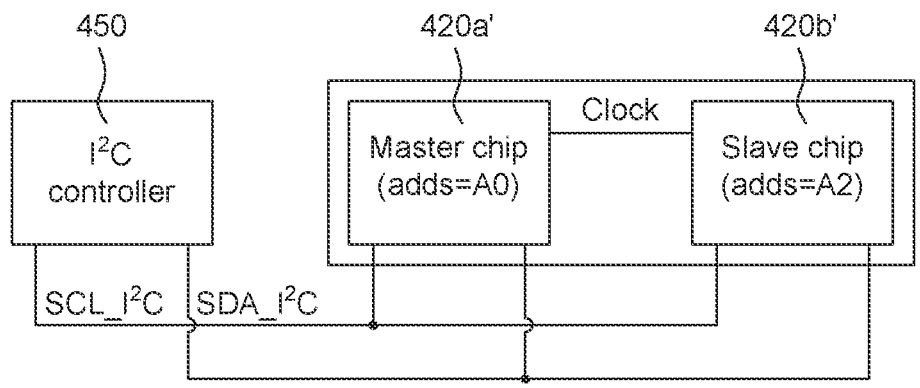
FIGS. 15A and 15B exemplarily illustrate a configuration for simultaneously driving a plurality of chips.
Figure 15B:
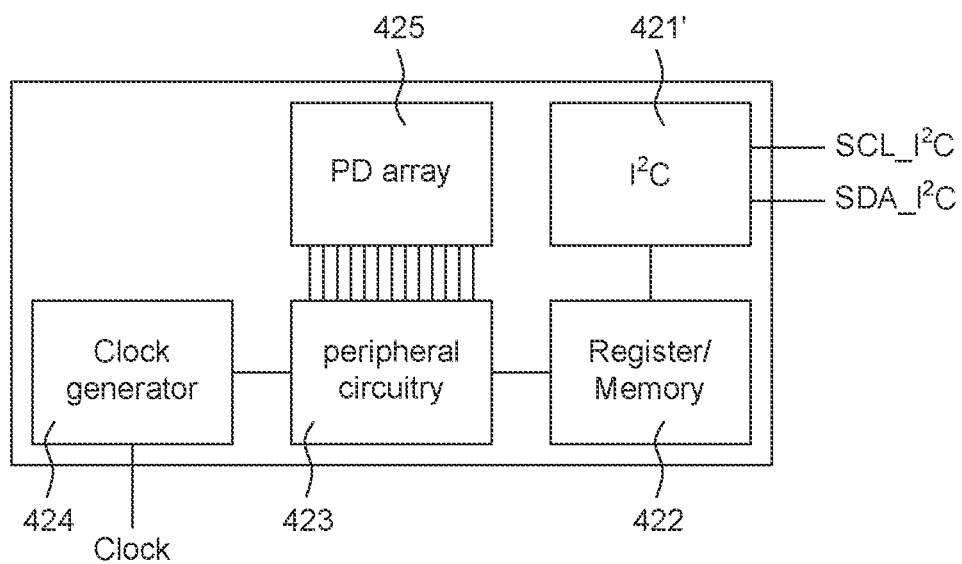

FIG. 15 exemplarily illustrates a configuration for simultaneously driving a plurality of chips, in which (a) shows two chips and a controller that drives them, and (b) shows a functional configuration of the chip. The same description as in FIG. 12 will be omitted, and differences will be described.

Referring to (a) of FIG. 15, a plurality of chips are set to the master mode and the slave mode, respectively, and the chip 420*a*' set to a master mode (hereinafter, master chip) monitors operating start of chip 420' set to a slave mode (hereinafter, slave chip) to start operating. Accordingly, compared with the embodiment described with reference to FIGS. 12 through 14, the chip illustrated in FIG. 15 does not include the enable input/output pad. Meanwhile, any one of the plurality of chips may provide the operating clock Clock required for simultaneous operating end to the remaining chips.

Simultaneous driving means that the operating start time are same and the operating end time are the same. In order for the operating start time to be the same, at least one master chip 420*a*' among the plurality of chips must be able to detect the operating start of one slave chip 420*b*' and for the operating end time to be the same, the plurality of chips must be driven by the same clock. To this end, the chips 420*a*', 420*b*' include clock input/output pads for inputting and outputting the operating clock Clock. The clock input/output pad is a pad for one chip to supply the operating clock Clock to the other chip or to receive the operating clock Clock externally. Additionally or alternatively, the chips 420*a*', 420*b*' may further include one or more option pads for determining the master mode or the slave mode. Using the option pad, the operation mode of each chip can be determined in advance.

The master chip 420*a*' and the slave chip 420*b*' may communicate with the controller 450 through the data line SDA_I$^2$C and one clock line SCL_I$^2$C. The controller 450 designates at least one or more of a plurality of chips having substantially the same function as the master chip 420*a*' and designates any one of the remaining chips as the slave chip 420*b*'. The master chip 420*a*' monitors the operating start of the slave chip 420*b*' and starts operating substantially simultaneously with the slave chip 420*b*'. The controller 450 may control the operating start of the slave chip 420*b*', thereby enabling the operating start of one or more master chips 420*a*'.

Referring to (b) of FIG. 15, the master chip 420*a*' and the slave chip 420*b*' include an I$^2$C communication unit 421', the register/memory 422, the peripheral circuit 423, the clock generator 424, and the photo cell area 425.

The I$^2$C communication unit 421' receives the control signal from the controller 450 through the data line SDA_I$^2$C and the clock line SCL_I$^2$C, and transmits data generated by the chips 420*a*' and 420*b*' to the controller 450. When operating in the master mode, the I$^2$C communication unit 421' monitors control signals transmitted and received through the data line SDA_I$^2$C to detect the operating start of the slave chip 420*b*'. Specifically, the I$^2$C communication unit 421' knows the chip address of the slave chip 420*b*', the third register address in which the operation start command is to be stored, and the fifth register value corresponding to the operation start command, and when the operating start command of the slave chip 420*b*' is transmitted through the data line SDA_I$^2$C, a register value corresponding to the operating start command is stored in the register of the master chip 420*a*' accordingly. The I$^2$C communication unit 421' of the master chip 420*a*' may store the fifth register value in the register/memory 422, (1) when the slave chip 420*b*' transmits to the controller 450 the response signal Ack indicating that has completed receiving the third register address in which the register value indicating the operating start is stored, or (2) when the slave chip 420*b*' transmits to the controller the response signal Ack indicating that has completed receiving the fifth register value indicating the operating start.

Figure 16:
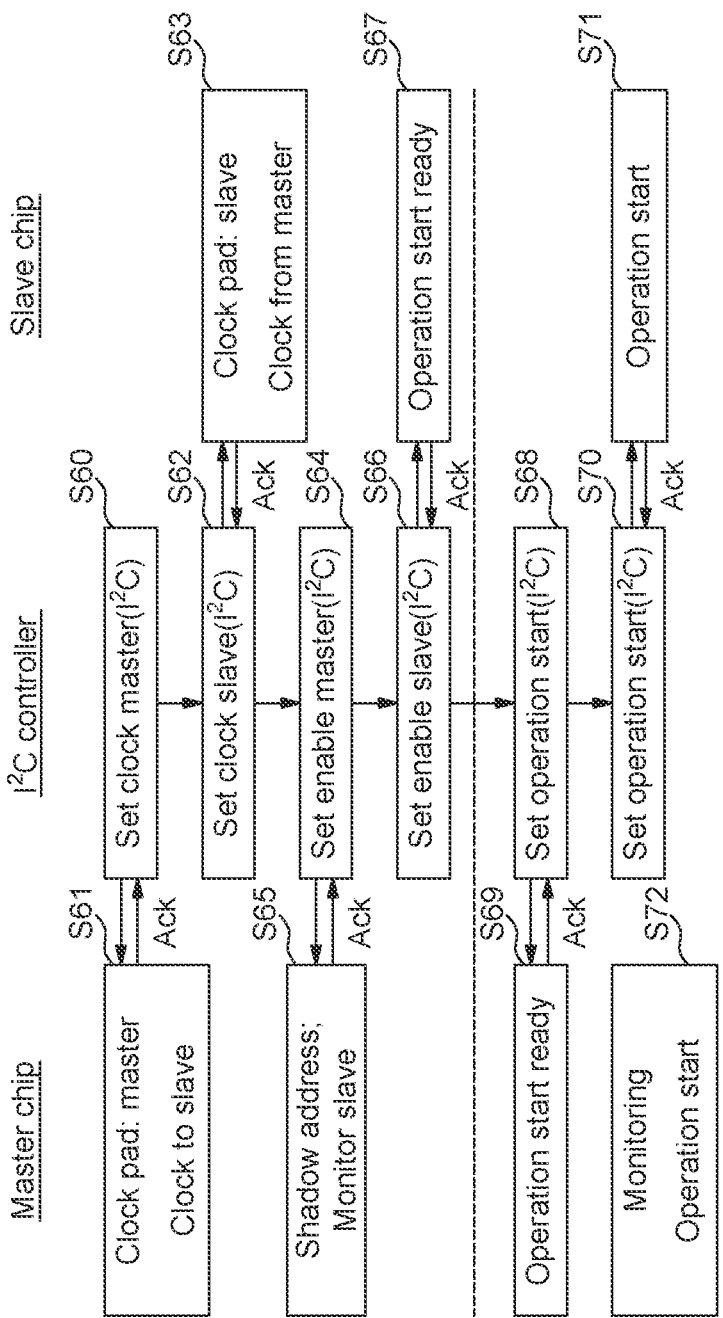
FIG. 16 exemplarily illustrates method of simultaneously driving a plurality of chips in the configuration illustrated in FIG. 15.

FIG. 16 exemplarily illustrates method of simultaneously driving a plurality of chips in the configuration illustrated in FIG. 15. Since S60 to S63 are the same as S20 to S23 of FIG. 13, same description will be omitted.

The controller 450 sets at least one or more of the plurality of chips as the master chip 420*a*' (S64). The controller 450 transmits a chip address of the master chip 420*a*', the second register address, the third register value indicating the enable master to be stored in the second register address, and the chip address of the slave chip 420*b*' through the data line SDA_I$^2$C.

The master chip 420*a*' stores the third register value and the chip address of the slave chip 420*b*' in the second register address, and then transmits the response signal Ack through the data line SDA_I²C (S65). Thereafter, the master chip 420a' captures the chip address transmitted through the data line SDA_I²C and performs monitoring that compares the captured chip address with the chip address of the slave chip 420b' stored in the second register address.

During monitoring, even if the master chip 420a' receives the chip address of the slave chip 420b', it only compares and does not transmit the response signal Ack. When the chip address of the slave chip 420b' is captured and the slave chip 420b' transmits the response signal Ack, the master chip 420a' captures the register address transmitted from the controller 450 and checks whether the captured register address is the third register address in which the fifth register value indicating the operating start is stored. When the slave chip 420b' transmits the response signal Ack, the master chip 420a' captures the register value transmitted from the controller 150 and checks whether it is the fifth register value indicating the operating start.

After monitoring of the master chip 420a' starts, the controller 450 sets any one of the plurality of sensors as a slave chip (S66). The controller 450 transmits a chip address of the slave chip 420b', the second register address, and the fourth register value indicating the enable slave to be stored in the second register address through the data line SDA_I²C.

The slave chip 420b' stores the fourth register value in the second register address and then transmits the response signal Ack through the data line SDA_I²C (S67). The slave chip 420b' enters the operating standby state.

When the controller 450 commands the master chip 420a' to start operating (S68), the master chip 420a' transmits the response signal Ack and enters the operating standby state (S69). The operating start command may include a chip address of the master chip 420a', the third register address, and the fifth register value indicating the operating start to be stored in the third register. That is, although the controller 450 commands the master chip 420a' to start operating, but the master chip 420a' wait until the slave chip 420b' being monitored receives the command to start operating from the controller 450.

When the controller 450 commands the slave chip 420b' to start operating (S70), the slave chip 420b' transmits the response signal Ack to start operating (S71). The operating start command may include a chip address of the slave chip 420b', the third register address, and the fifth register value indicating the operating start to be stored in the third register address.

When the master chip 420a' captures the chip address of the slave chip 420b', it starts operating by the register address and the response signal Ack to be transmitted thereafter, or by the register value or response signal Ack for receiving the register value (S72). Accordingly, the plurality of chips designated as the master chip 420a' and the slave chip 420b' can start operating simultaneously.

The aforementioned description for the present invention is exemplary, and those skilled in the art can understand that the invention can be modified in other forms without changing the technical concept or the essential feature of the invention. Therefore, it should be understood that the embodiments described above are illustrative and non-limiting in all respects. In particular, the features of the present invention described with reference to the drawings are not limited to the structures shown in the specific drawings, and may be implemented independently or in combination with other features.

The scope of the invention is defined by the appended claims, not by the above detailed description, and it should be construed that all changes or modifications derived from the meanings and scope of the claims and equivalent concepts thereof are included in the scope of the invention.

What is claimed is:

1. An under-display sensor disposed under a display having a pixel configured for generating light, and a display retardation layer and a display polarization layer, both being disposed over the pixel, comprising:
   an optical sensor, having an emitter configured for emitting a sensing light and a receiver configured for detecting an externally-reflected light reflected from an object and returned by the sensing light;
   a sensor polarization layer, being disposed over the optical sensor and having a polarization axis inclined at a first angle; and
   a sensor retardation layer, being disposed over the sensor polarization layer and having a slow axis inclined at the first angle with respect to the polarization axis,
   wherein the slow axis of the sensor retardation layer and a slow axis of the display retardation layer are parallel, and the polarization axis of the display polarization layer is inclined at a second angle with respect to the slow axis of the display retardation layer, and
   wherein a difference between the second angle and the first angle is 90 degrees.

2. The under-display sensor according to claim 1, wherein the sensor polarization layer and the sensor retardation layer convert the sensing light into a sensor circularly-polarized light for sensing so as to pass through the display polarization layer, and the sensor circularly-polarized light for sensing is converted into a display linearly-polarized light for sensing with a same polarization axis as the polarization axis of the display polarization layer by the display retardation layer.

3. The under-display sensor according to claim 1, wherein the receiver comprises a first receiver and a second receiver for detecting the externally-reflected light and an internally-reflected light reflected by the emitted sensing light within the display.

4. The under-display sensor according to claim 3, wherein the sensor polarization layer comprises:
   a first sensor polarization layer, being disposed over the first receiver and having a polarization axis inclined at the first angle; and
   a second sensor polarization layer, being disposed over the second receiver and having a polarization axis inclined at the second angle.

5. The under-display sensor according to claim 4, wherein the first sensor polarization layer and the sensor retardation layer allow the externally-reflected light to pass, and the internally-reflected light to pass at a transmission blocking ratio of internal reflection, and
   the second sensor polarization layer and the sensor retardation layer allow the externally-reflected light to pass at a transmission blocking ratio of the external light, and the internally-reflected light to pass,
   wherein a brightness of the externally-reflected light is calculated using the transmission blocking ratio of the external light and the transmission blocking ratio of internal reflection.

6. The under-display sensor according to claim 5, wherein the transmission blocking ratio of the external light is measured when the emitter is turned off, and the transmission blocking ratio of internal reflection is measured when the externally-reflected light is not present.

7. The under-display sensor according to claim 3, wherein the sensor retardation layer comprises:
- a first sensor retardation layer, being disposed over the sensor polarization layer to correspond to the first receiver and having a slow axis inclined at the first angle with respect to the polarization axis; and
- a second sensor retardation layer, being disposed over the sensor polarization layer to correspond to the second receiver and having a slow axis inclined at the second angle with respect to the polarization axis.

8. The under-display sensor according to claim 1 further comprising an emitter driver configured for driving the emitter,
wherein the emitter driver comprises:
- a light source signal generator configured for generating a basic light source driving signal in which a continuous on period and a continuous off period are repeated;
- a carrier generator configured for generating a carrier signal having a frequency higher than that of the basic light source driving signal;
- a signal modulator configured for generating the modulated light source driving signal by frequency-modulating the continuous on period of the basic light source driving signal using the carrier signal; and
- a light source for generating a modulated sensing light by turning on and off at a frequency of the carrier signal during the continuous on period by the modulated light source driving signal.

9. The under-display sensor according to claim 8 further comprising:
- a band pass filter configured for removing a frequency component of the carrier signal from a pixel current;
- an amplifier configured for amplifying the pixel current from which the frequency component of the carrier signal has been removed; and
- an analog-to-digital converter configured for converting amplified pixel current into a digital signal.

10. The under-display sensor according to claim 3, wherein the first receiver and the second receiver are respectively located above two or more physically separated chips,
wherein the under-display sensor is simultaneously driven under the control of a controller when the two or more chips are connected to the controller through I²C communication.

11. The under-display sensor according to claim 10, wherein each of the two or more chips comprises:
- an enable input/output pad;
- an I²C communication unit configured for receiving a first register value designating any one of a master chip and a slave chip and a second register value indicating an operating start from the controller through a data line;
- a register/memory configured for storing the first register value in a first register address and storing the second register value in a second register address; and
- a peripheral circuit configured for outputting an operating standby signal through the enable input/output pad when set as the master chip by the first register value, and configured for outputting an operating start signal through the enable input/output pad based on the second register value.

12. The under-display sensor according to claim 11, wherein when set as the slave chip by the first register value, the peripheral circuit is configured for receiving the operating standby signal through the enable input/output pad, and is configured for starting when receiving the operating start signal through the enable input/output pad.

13. The under-display sensor according to claim 11 further comprising a clock input/output pad for providing an operating clock to another chip connected through the I²C communication when set as a clock master by the controller, and is configured for receiving the operating clock from one of the other chips or from an external device when set as a clock slave.

14. The under-display sensor according to claim 12 further comprising a clock generator configured for generating the operating clock to be outputted through the clock input/output pad.

15. The under-display sensor according to claim 11, wherein the two or more chips start operating at a same operating start time and operating end at a same operating end time.

16. The under-display sensor according to claim 10, wherein each of the two or more chips comprise:
- an I²C communication unit configured for receiving a register value designating any one of a master chip and a slave chip from the controller through a data line, and configured for monitoring an operating start of the slave chip through the data line;
- a register/memory for storing the register value; and
- a peripheral circuit configured for starting when set as the master chip by the register value and the slave chip being monitored starts operating.

17. The under-display sensor according to claim 16, wherein when set to the master chip by the register value, the I²C communication unit is configured for:
- storing a chip address of the slave chip provided by the controller;
- capturing a chip address being transmitted through the data line and comparing the stored chip address with the capture chip address;
- if the captured chip address is the same as the stored chip address, capturing a register address being transmitted to the slave chip; and
- comparing the captured register address with a register address in which a register value indicating the operating start is stored,
wherein the master chip does not transmit a response signal to the controller even if the captured chip address is the same as the stored chip address.

18. The under-display sensor according to claim 17, wherein the peripheral circuit is configured for starting when the captured register address is the register address in which the register value indicating the operating start is stored.

19. The under-display sensor according to claim 17, wherein the I²C communication unit is configured for capturing the register value being transmitted to the slave chip, if the captured register address is the register address in which the register value indicating operating start is to be stored,
wherein the peripheral circuit is configured for starting when the captured register value is the register value indicating the operating start.

20. The under-display sensor according to claim 16, wherein when the controller transmits an operating start command, the peripheral circuit waits until the slave chip starts operating.

21. The under-display sensor according to claim 16 further comprising a clock input/output pad for providing an operating clock to another chip connected through the I²C communication when set as a clock master by the controller, and is configured for receiving the operating clock from one of the other chips or from an external device when set as a clock slave.

\* \* \* \* \*